US012546837B2

(12) United States Patent
Theis et al.

(10) Patent No.: US 12,546,837 B2
(45) Date of Patent: Feb. 10, 2026

(54) PARAHYDROGEN HYPERPOLARIZATION MEMBRANE REACTOR

(71) Applicant: North Carolina State University, Raleigh, NC (US)

(72) Inventors: Thomas Theis, Raleigh, NC (US); Milad Abolhasani, Raleigh, NC (US); Patrick Tomhon, Raleigh, NC (US); Sören Lehmkuhl, Raleigh, NC (US); Suyong Han, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 801 days.

(21) Appl. No.: 17/916,703

(22) PCT Filed: Apr. 7, 2021

(86) PCT No.: PCT/US2021/026093
§ 371 (c)(1),
(2) Date: Oct. 3, 2022

(87) PCT Pub. No.: WO2021/207297
PCT Pub. Date: Oct. 14, 2021

(65) Prior Publication Data
US 2023/0152398 A1    May 18, 2023

Related U.S. Application Data

(60) Provisional application No. 63/006,129, filed on Apr. 7, 2020.

(51) Int. Cl.
*G01R 33/28* (2006.01)
*G01R 33/46* (2006.01)

(52) U.S. Cl.
CPC ........... *G01R 33/282* (2013.01); *G01R 33/46* (2013.01)

(58) Field of Classification Search
CPC .............................. G01R 33/282; G01R 33/46
See application file for complete search history.

(56) References Cited

U.S. PATENT DOCUMENTS 5,210,059 A    5/1993    Matturo et al.
5,420,090 A    5/1995    Spencer et al.
(Continued)

FOREIGN PATENT DOCUMENTS

JP          200502189 A        1/2005

OTHER PUBLICATIONS

Tijssen, et al. "Monitoring Heterogeneously Catalyzed Hydrogenation Reactions at Elevated Pressures Using In-Line Flow NMR", Anal. Chem. 2019, 91, 20, 12636?12643; Sep. 11, 2019.
(Continued)

*Primary Examiner* — Kathryn Elizabeth Limbaugh
(74) *Attorney, Agent, or Firm* — Thomas|Horstemeyer, LLP

(57) ABSTRACT

In one aspect, the disclosure relates to a compact membrane reactor for parahydrogen induced hyperpolarization, the reactor including an inner tube constructed of a semipermeable membrane, an outer tube surrounding the inner tube, and a means for controlling the magnetic field surrounding the outer tube. In some aspects, multiple compact membrane reactors can be arranged in parallel. In other aspects, the compact membrane reactor is equipped with a mechanism for magnetic field control. Also disclosed are fluid handling systems and sample preparation systems comprising the compact membrane reactors disclosed herein. The compact membrane reactor can be operated in a batch mode, a stopped-flow mode, or a continuous flow mode and can be configured to work with existing NMR spectrometers and MRI instruments.

16 Claims, 14 Drawing Sheets

(56) References Cited

U.S. PATENT DOCUMENTS

| 2003/0206830 | A1 | 11/2003 | Akporiaye et al. |
| 2012/0071316 | A1 | 3/2012 | Voss et al. |
| 2015/0323616 | A1 | 11/2015 | Tang et al. |
| 2017/0056532 | A1 | 3/2017 | Freeman et al. |
| 2017/0153218 | A1 | 6/2017 | Chekmenev et al. |

OTHER PUBLICATIONS

Joalland, et al., "Parahydrogen-Induced Radio Amplification by Stimulated emission of Radiation", Angewandte Chemie; Mar. 24, 2020.

International Search Report in co-pending, related PCT Application No. PCT/US21/26093, mailed Aug. 5, 2021.

Bordonali, L., et al. Parahydrogen based NMR hyperpolarisation goes micro: an alveolus for small molecule chemosensing. Lab Chip. Jan. 29, 2019;19(3):503-512.

Cui, Z., et al., "Recent progress in fluoropolymers for membranes", Progress in Polymer Science, vol. 39, Issue 1, 2014, pp. 164-198.

Dechent, J.F., et al., "Continuous Proton Hyperpolarization via SABRE and Hollow fiber Membranes", Proceedings of the International Society for Magnetic Resonance in Medicine, 21st Annual Meeting & Exhibition, Apr. 7, 2023.

Lehmkuhl, S., et al., "Continuous hyperpolarization with parahydrogen in a membrane reactor. J Magn Reson. Jun. 2018;291:8-13.".

Rotch, M., "Continuous (1)H and (13)C signal enhancement in NMR spectroscopy and MRI using parahydrogen and hollow-fiber membranes." Angewandte Chemie 49 45 (2010): 8358-62.

Tomhon,P.M., et al., "A Versatile Compact Parahydrogen Membrane Reactor." Chemphyschem. Dec. 13, 2021;22(24):2526-2534.

Yang, J., et al., "The Steady-State Altadena Raser Generates Continuous NMR Signals." Chemphyschem. Jul. 17, 2023;24(14).

Zhivonitko, V.V. et al., Zhivonitko, Vladimir V. et al. "Characterization of microfluidic gas reactors using remote-detection MRI and parahydrogen-induced polarization." Angewandte Chemie 51 32 (2012): 8054-8.

PARAHYDROGEN HYPERPOLARIZATION MEMBRANE REACTOR

CROSS REFERENCE TO RELATED APPLICATIONS

This application is a U.S. national phase application under 35 U.S.C. 371 of International Patent Application No. PCT/US2021/026093, filed Apr. 7, 2021, which claims priority upon U.S. Provisional Application No. 63/006,129, filed on Apr. 7, 2020, both of which are incorporated herein by reference in their entireties.

STATEMENT REGARDING FEDERALLY SPONSORED RESEARCH OR DEVELOPMENT

This invention was made with government support under grant number R21 EB025313 awarded by the National Institutes of Health. The government has certain rights in the invention.

BACKGROUND

Magnetic resonance imaging relies on the alignment of nuclear spins with a magnetic field to create detectable signals. Even in the strongest magnets, only a small fraction of nuclear spins align with the magnetic field (measured in ppm). This "normal" spin alignment is known as thermal polarization. In contrast, hyperpolarization aligns almost all spins with the magnetic field, achieving signal enhancements of up to 10,000,000-fold. To date, hyperpolarization approaches have been prohibitively expensive and typical hyperpolarization agents for use in human and animal subjects have short lifetimes of under one minute, rendering them of limited use in clinical settings.

Nuclear magnetic resonance spectroscopy (NMR) and magnetic resonance imaging (MRI) are useful and ubiquitous tools for chemical analysis and clinical imaging, respectively. Applications range from fundamental physics experiments to radiological diagnosis and treatment of disease. Traditional magnetic resonance is limited by low thermal spin polarization, reducing sensitivity and requiring large superconducting magnets for spectroscopy and imaging. Additionally, current magnetic resonance imaging techniques are limited to visualizing water in soft tissues and cannot provide more detailed chemical and metabolic information. With hyperpolarization, NMR and MRI signals can be enhanced by up to 7 orders of magnitude, thus eliminating the need for many PET and SPECT scans, which may require dangerous ionizing radiation as well as high costs. In addition to low sensitivity for current MRI techniques, potentially toxic contrast agents such as gadolinium may be required to enhance sensitivity.

Currently, hyperpolarized MRI is a niche research area because of high complexity and high cost; existing hyperpolarization equipment can cost $2.5 million or more and typically operates only in batch mode (i.e., is not capable of continuous operation). Furthermore, batches are typically available only infrequently (i.e., every 30 minutes) and thus not suitable for real-time imaging. Existing equipment may also have specific temperature requirements (e.g., operation at temperatures as low as 28K) that are difficult to achieve under typical clinical or laboratory conditions.

Parahydrogen-induced hyperpolarization uses parahydrogen (p-$H_2$) as a source of spin order to generate hyperpolarization in target substrates either through chemical addition or exchange reactions. For example, hydrogenation reactions allow for direct production of hyperpolarized substrates through chemical reaction but are limited in scope due to chemical modification. Another approach, which does not directly introduce hydrogen into a substrate, is Signal Amplification by Reversible Exchange (SABRE), which uses an organometallic catalyst to transfer spin order from p-$H_2$ to target substrates. In all parahydrogen hyperpolarization methods, fast delivery of parahydrogen (where "fast" is measured relative to competing relaxation mechanisms) is a major bottleneck. In traditional SABRE approaches, gas delivery methods include bubbling and shaking to mix gas and liquid phases. However, these techniques suffer from low gas-liquid mass transfer rates into the solution or are otherwise not amenable to process automation in a reliable manner.

In gas-liquid reactions, mass transfer of gas into the liquid phase is primarily determined by the gas-liquid interfacial area and contact time. Conventional batch methods such as bubble columns offer relatively low gas-liquid interfacial areas (50-600 $m^2/m^3$). Due to poorly-defined specific interfacial areas, multi-phase gas-liquid reactions often suffer from mass-transfer limitations and exhibit low overall mass transfer coefficients (0.005-0.25 $s^{-1}$). Mass transfer-limited chemical processes typically display low reaction yields and/or significantly longer processing times, hindering fundamental understandings of the underlying mechanisms of parahydrogen hyperpolarization and limiting maximum hyperpolarization levels.

The parahydrogen pumped RASER, or radiowave amplification by stimulated emission of radiation, is a newly explored physical effect in the field of magnetic resonance. This effect is the magnetic resonance analogue to a visible wavelength radiation in a laser, requiring a pumped population inversion that results in coherent emission of radiation. Parahydrogen-induced RASER effects have been previously introduced, utilizing the parahydrogen-induced population inversion of SABRE to drive stimulated emission at NMR frequencies. Continuous pumping of NMR transitions in resonance with the LC NMR circuit enables continuous detection of NMR signal normally limited to $T_2$ relaxation, enabling measurement of NMR signals with linewidths of <3 mHz thereby accessing a range of applications including high-precision magnetometry. Several subsequent publications have explored this effect but have either been limited to low magnetic fields, where bubbling susceptibility artifacts are minimized, or restricted by short-lived or unstable RASER detection.

It would be desirable to have a method, device, and/or apparatus capable of achieving higher polarization levels, of operating in both continuous and batch modes for a period of at least several hours to several days, that is easily automated and coupled to existing parahydrogen hyperpolarization approaches, that can operate at room temperature, and that is robust in performance. It would also be desirable if the method, device, and/or apparatus enabled high gas-liquid mass transfer rates. It would further be desirable if the method, device, and/or apparatus represented a significant cost savings over existing technologies. It would also be desirable if the method, device, and/or apparatus could track real-time chemical metabolic transformations in vivo. It would additionally be desirable if SABRE-pumped RASER effects could be expanded into high-field magnets (>1 T), demonstrating stable detection of RASER signals on the scale of minutes to hours. The present disclosure addresses these needs.

SUMMARY

In accordance with the purpose(s) of the present disclosure, as embodied and broadly described herein, the disclosure, in one aspect, relates to a compact membrane reactor for parahydrogen-induced hyperpolarization, the reactor including an inner tube constructed of a semipermeable membrane, an outer tube surrounding the inner tube, and a means for controlling the magnetic field around the outer tube. In some aspects, multiple compact membrane reactors can be arranged in parallel. In other aspects, the compact membrane reactor is equipped with a mechanism for radio frequency pulses. Also disclosed are fluid handling systems and sample preparation systems comprising the compact membrane reactors disclosed herein. The compact membrane reactor can be operated in a batch mode, a stopped-flow mode, or a continuous flow mode and can be configured to work with existing NMR spectrometers and MRI instruments.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4A represents a structure of the most efficient PTC in methanol. FIG. 4B represents a water-soluble PTC. FIG. 4C represents a proposed water soluble PTC with a reduced steric burden.

(FIG. 8A) Mode of operation of a RASER, whereas a pumped highly polarized population inversion is coupled to photons in an NMR LC circuit. (FIG. 8B) Buildup of RASER effects observed where a polarization threshold inducing RASER is observed at ~0.5% polarization as the pressure is ramped from 0 to 90 psi.

(FIG. 9A) Continuous detection of a RASER from pyrazine protons with a total acquisition time of 157.3 s and a dwell time of 1200 μs. This stable RASER detection enables calibration of the magnetic field drift and corresponding correction of the Fourier transform of the full 157.3 s observed RASER, yielding a precise FWHM of 23 mHz. (FIG. 9B) Continuous detection of a RASER from the ortho protons of pyridine with a total acquisition time of 180 s. Here, the flow dependence of the two RASER spectra demonstrates stability of the pumping as well as the polarization dependence of RASER phenomena dependent on the extent the system is above the threshold.

Figure 1:
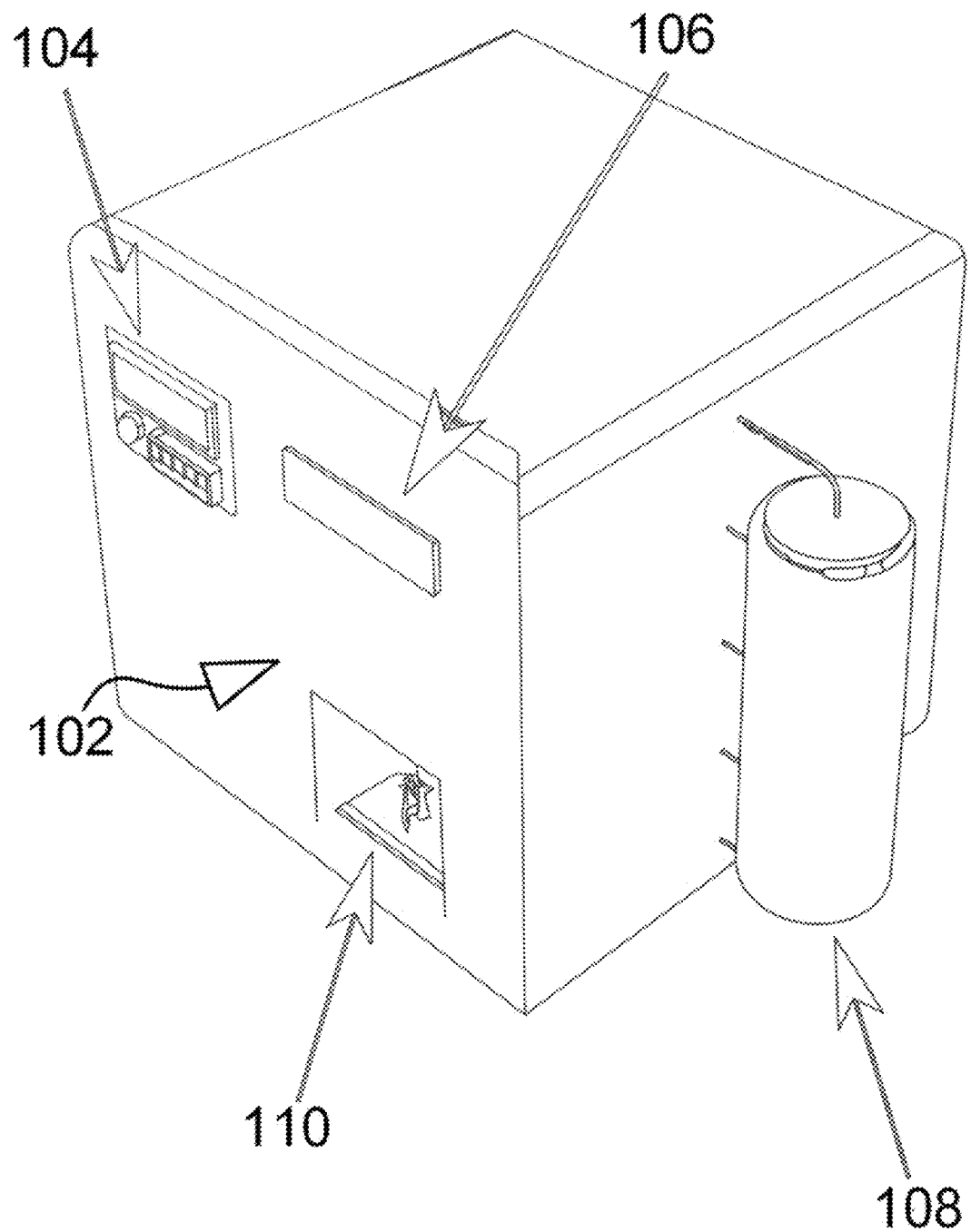
FIG. 1 shows a basic hyperpolarization unit with flow control system for batch processing according to one aspect of the present disclosure. The hyperpolarization unit includes a sterile cartridge window for receiving a substrate, a control unit for processing pre-programmed input parameters, a sample dispensing capable of transferring hyperpolarized compound(s) to a vial for easy injection, and a unit for purification of hyperpolarized substrate solution.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a catalyst" includes, but is not limited to, mixtures or combinations of two or more such catalysts, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-arranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a polarization transfer catalyst refers to an amount that is sufficient to achieve the desired improvement in the property modulated by the formulation component, e.g. achieving the desired level of polarization transfer to the nucleus of interest. The specific level in terms of wt % in a composition required as an effective amount will depend upon a variety of factors including the solvent or biological fluid in which the sample to be analyzed is dissolved, the concentration of analyte, field strength of the magnet to be used, and pulse program to be used, among other factors.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

"Thermal polarization" as used herein refers to the fraction of nuclear spins that align with a magnetic field under normal conditions. This is typically a small number and can be measured in units of parts per million (ppm), even in a strong magnetic field.

By contrast, "hyperpolarization" refers to nuclear spin polarization far beyond thermal equilibrium conditions. In one aspect, hyperpolarization aligns almost all spins with the magnetic field, achieving signal enhancements of up to 10,000,000-fold when compared to thermal polarization.

As used herein, "batch mode" refers to a manufacturing process that runs in time intervals with discrete beginnings and endings. In some aspects, batch mode is used when a process takes a significant amount of time. In other aspects, batch mode is used when continuous operation is not practical (for example, when injecting a hyperpolarized sample into a subject for MRI analysis). In one aspect, the reactor and process disclosed herein can be configured to operate in batch mode.

By contrast, "continuous operation" refers to a manufacturing process using fluids that are continuously in motion. In some aspects, continuous operation can run without stopping for days or even weeks or years without stopping. In one aspect, the reactor and process disclosed herein can be configured to operate continuously.

As used herein, "stopped flow" refers to a method in which fluids move as in a continuous operation to reach a steady state and remain at that state until stopped by an operator or by automated means for the purpose of sample collection. Following sample collection, the stopped flow method may be reinstated as a continuous flow.

As used herein, "segmented flow" refers to a method in which a continuous stream of material is divided by air bubbles into segments in which chemical reactions occur.

"Orthohydrogen" (o-$H_2$) is an isomeric form of molecular hydrogen. In o-$H_2$, the spins of both nuclei are symmetrically aligned. In one aspect, at room temperature and thermal equilibrium, approximately 75% of an $H_2$ sample is in the orthohydrogen (triplet) state.

"Parahydrogen" (p-$H_2$) is a second isomeric form of molecular hydrogen. In p-$H_2$, the spins of both nuclei are anti-symmetrically aligned. In one aspect, at room temperature and thermal equilibrium, approximately 25% of an $H_2$ sample is in the parahydrogen (singlet) state. In a further aspect, use of parahydrogen exhibits hyperpolarized signals in NMR spectra. In one aspect, the reactor and process disclosed herein use parahydrogen to induce transfer spin in order to induce hyperpolarization in samples for NMR and MRI analysis. "Parahydrogen Induced Polarization" or "PHIP" is a hyperpolarization technique using p-$H_2$ as a source of spin transfer for inducing hyperpolarization. In one aspect, PHIP involves chemical reaction of p-$H_2$.

"Signal amplification by reversible exchange" or "SABRE" is a technique that can increase the visibility of compounds for the purpose of NMR and MRI analysis, which in turn allows lower detection limits and shorter scan times in NMR, as well as higher contrast and higher resolution in MRI imaging. In one aspect, a metal-containing catalyst transfers spin from parahydrogen to a substrate, which can then be imaged or analyzed as appropriate.

"Radiowave amplification by stimulated emission of radiation" or "RASER" as used herein refers to a device that generates coherent waves in the radiowave region of the electromagnetic spectrum. RASERs can be pumped with parahydrogen, including hyperpolarized parahydrogen produced by the methods disclosed herein, and NMR spectroscopy making use of RASER effects allows for the determination of molecular structures with high levels of precision. In one aspect, combined SABRE-RASER techniques allow for the collection of high precision data from samples having low concentrations of target analytes.

"Gas-liquid mass transfer" as used herein refers to the net movement of mass from a gas component to a liquid component such as, for example, the net movement of parahydrogen into a biological sample of interest. In one aspect, known approaches involve bubbling gas through a liquid sample or shaking the sample; however, these approaches typically result in low levels of gas-liquid mass transfer. In a further aspect, the reactor and process disclosed herein result in much higher level of gas-liquid mass transfer than current approaches, thus enabling a faster and more robust polarization transfer process.

As used herein, "biotracer" refers to a drug molecule, vitamin, or other organic molecule useful in imaging applications. In one aspect, the biotracer can be hyperpolarized using the reactor and process disclosed herein, injected into a patient or subject, and then visualized using magnetic resonance imaging.

As used herein, a "polarization transfer catalyst" is a metal containing catalyst that transiently binds both a substrate molecule and p-H$_2$, thereby allowing polarization to transfer from the p-H$_2$ to the substrate in a magnetic field. In some aspects, the metal in the polarization transfer catalyst is iridium. In another aspect, the iridium is typically coordinated with species containing aromatic rings and/or nitrogen heterocycles.

"Spin-Lock Induced Crossing" or "SLIC" is a pulse sequence for NMR and MRI that can transfer long-lived polarization from heteronuclei to proton nuclei, allowing for detectable hyperpolarization on proton channels. In one aspect, SLIC is particularly useful when coupling the disclosed reactor to existing MRI equipment, which is only capable of detecting proton signals.

"FEP tubing" or fluorinated ethylene propylene as used herein is clear tubing with broad chemical resistance and temperature tolerance. In one aspect, FEP tubing is biocompatible. In another aspect, FEP tubing is useful for low-pressure microfluidics. In some aspects, FEP tubing is an important component of the reactor disclosed herein.

In some aspects, the reactor and continuous flow system disclosed herein are "microfluidic." In a further aspect, microfluidic systems can be geometrically constrained to a small scale and a small volume (e.g., on the μL or nL scale, or, in some aspects, on the mL scale) and consume low amounts of energy.

As used interchangeably herein, "subject," "individual," or "patient" can refer to a vertebrate organism, such as a mammal (e.g. human). "Subject" can also refer to a cell, a population of cells, a tissue, an organ, or an organism, preferably to human and constituents thereof.

Hyperpolarization Catalysts

Figures 4A, 4B, 4C:
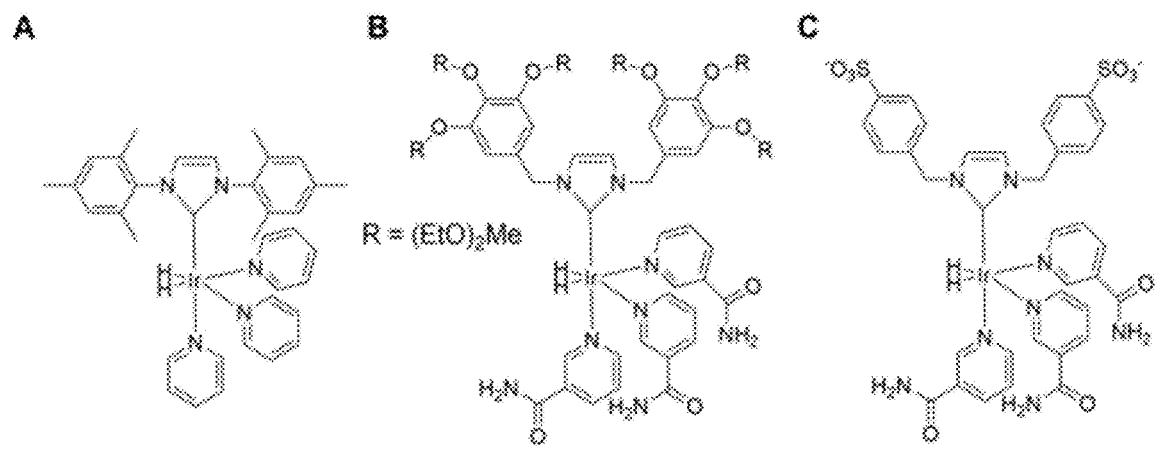
FIGS. 4A-4C show chemical structures of polarization transfer catalysts (PTCs).

In some aspects, the processes disclosed herein are conducted in water (or, as appropriate, deuterium oxide). Further in these aspects, polarization transfer catalysts must be water soluble. In one aspect, FIG. 4 shows polarization transfer catalysts. FIG. 4A shows an efficient catalyst for methanol, FIG. 4B shows a water-soluble catalyst, and FIG. 4C shows a proposed water-soluble polarization transfer catalyst with reduced steric burden.

In another aspect, additional catalysts can be synthesized by attaching polar chains to catalysts such as those in FIG. 4 using known methods. In a further aspect, sulfonate groups ($SO_3^-$) may be particularly useful.

Figure 5:
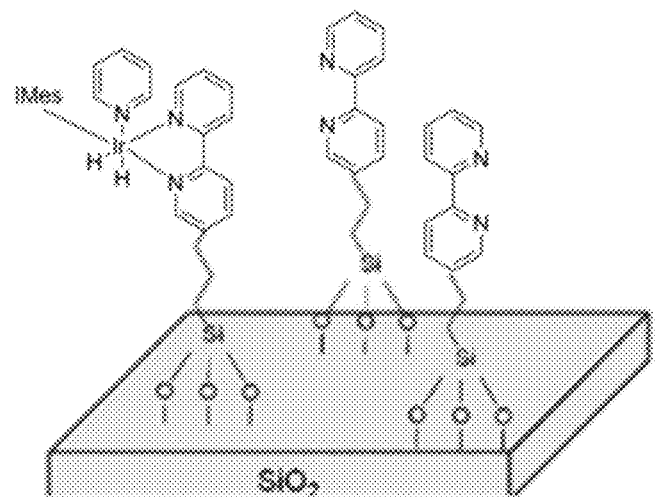
FIG. 5 shows a schematic of bipyridine supported on a silica substrate. In some aspects, iridium-containing catalysts containing nitrogen heterocycles can be supported on a silica substrate in an analogous manner, allowing for easy filtration to remove the catalysts from the sample in order to provide a safely-injectable solution.

In some aspects, catalysts can be immobilized on a surface such as, for example, silica beads (see FIG. 5). In one aspect, immobilizing catalysts on a surface can aid in the later removal of catalysts from solutions such as, for example, by processing solutions through a filter that traps the surface whereupon the catalysts have been immobilized. In a further aspect, this allows recycling of catalysts as well as production of solutions safe for injection into subjects.

Hyperpolarization of Biotracers

In one aspect, the reactor and process disclosed herein are capable of transferring hyperpolarization to biotracers. In one aspect, this can be accomplished in primary biological fluids such as, for example, cerebrospinal fluid and whole blood, as well as in solvents such as, for example, methanol and water. In another aspect, the reactor and process disclosed herein are capable of inducing long-lived hyperpolarization on heteronuclei including, but not limited to, $^{15}$N and $^{13}$C, wherein the lifetime of hyperpolarization can be up to one hour.

In a further aspect, the reactor and process disclosed herein can be used to characterize hyperpolarization lifetimes of a sample molecule such as, for example, metronidazole or another nitrogen-containing drug, in a variety of solutions having different viscosities, chemical compositions, and the like. In some aspects, molecules of interest can be labeled with tags such as, for example, diazirine in order to harness long-lived $^{15}$N singlet states; in a further aspect, the tags are small and well-suited for labeling of biomolecules as they do not perturb the biochemical function of the modified compounds.

In any of these aspects, the disclosed reactor and process enable polarization transfer from heteronuclei to $^1$H to facilitate detection on existing MRI scanners. In one aspect, the radio frequency pulse Spin-Lock Induced Crossing (SLIC) can transfer long-lived polarization from heteronuclei to proton nuclei, allowing for detectable hyperpolarization on proton channels. In a further aspect, SLIC sequences use irradiation of the target protons, effectively "pulling" polarization from the neighboring coupled heteronuclear spins. In one aspect, as the excitation also occurs on the means for controlling the magnetic field (such as, for example, a proton RF coil) in this method, no additional electronics are required for application to existing MRI scanners. In a further aspect, sub-second pulses can product detectable hyperpolarized proton signals throughout the hyperpolarized heteronucleus lifetime.

Parahydrogen Hyperpolarization Membrane Reactor

Disclosed herein is a parahydrogen hyperpolarization membrane reactor. In one aspect, parahydrogen-induced hyperpolarization can be implemented in the disclosed reactor to generate high spin polarization on $^1$H, $^{15}$N, $^{13}$C, $^{31}$P, or any other nuclei of interest. In one aspect, the reactor incorporates a compact tubular membrane for parahydrogen delivery into solution with a high gas-liquid interfacial area. In one aspect, this area is from about 1000 m$^2$/m$^3$ to about 10,000 m$^2$/m$^3$, or is about 1000, 1500, 2000, 2500, 3000, 3500, 4000, 4500, 5000, 5500, 6000, 6500, 7000, 7500, 8000, 8500, 9000, 9500, or about 10000 m$^2$/m$^3$, or a combination of any of the foregoing values, or a range encompassing any of the foregoing values. In one aspect, this area is from about 5000 to about 10,000 $m^2/m^3$. In a further aspect, this high interfacial area enables enhanced gas-liquid mass transfer rates. In another aspect, the membrane reactor allows for continuous as well as batch mode delivery of highly polarized solutions.

In another aspect, hydrogen may have reduced solubility in water compared to other solvents such as, for example, methanol, which may not be bio-compatible. In one aspect, a high-pressure system that can provide parahydrogen pressures of up to 100 bar (~1500 psi) can be used to increase the available amount of parahydrogen.

In any of these aspects, the reactor design can be compact and portable. In a further aspect, the reactor can be less than 1 inch in diameter and less than 12 inches in length. In one aspect, the compact design allows for facile implementation in all polarization transfer field ranges such as, for example, from 0 to μT, from μT to mT, from mT to T, and the like.

In one aspect, precise temperature control is available for the reactor, allowing for rapid heating and cooling, so that hyperpolarization settings can be optimized for use with the reactor.

In some aspects, flow control systems can be coupled with gas displacement and flow control systems for generation of continuous parahydrogen-induced hyperpolarization. In another aspect, these flow control systems can be adapted for continuous and batch preparation of hyperpolarized solutions in sufficient quantity for clinical experiments in subjects, for example by using parallel reactors.

In a further aspect, optimized parahydrogen delivery as disclosed herein allows for direct application in chemical modifications and exchange such as, for example, hydrogenation or parahydrogen induced polarization (PHIP), signal amplification by reversible exchange (SABRE) and the like. In a still further aspect, radio-frequency based hyperpolarization transfer as well as field cycling methods for polarization transfer manipulations can be implemented with the disclosed reactor and process.

In one aspect, the disclosed reactor and process can be operated with various additional parameter controls for higher polarization enhancement. In one aspect, temperature control can be achieved with an aluminum reactor plate combined with a casing through which thermocouple capillaries are inserted. In another aspect, batch control for preparation of large volumes of hyperpolarized solutions can be implemented through reactor parallelization and solution pre-activation.

In another aspect, disclosed herein is flow control of the hyperpolarized solution for implementation of continuously hyperpolarized systems and preparation of injectable hyperpolarized biotracers. Several equipment configurations are described in more detail below.

In one aspect, disclosed herein is a compact membrane reactor for parahydrogen-induced hyperpolarization, the reactor including an inner tube made from a semipermeable membrane, an outer tube surrounding the inner tube, and a means for controlling the magnetic field within the entire system, wherein the means for controlling the magnetic field within is configured to hyperpolarize parahydrogen in the outer tube and wherein the hyperpolarized hydrogen permeates the inner tube and induces hyperpolarization in a sample in the inner tube. In some aspects, the semipermeable membrane has a gas-liquid interfacial area of greater than 1000 $m^2/m^3$, greater than 1500 $m^2/m^3$, greater than 2000 $m^2/m^3$, greater than 2500 $m^2/m^3$, greater than 3000 $m^2/m^3$, greater than 3500 $m^2/m^3$, greater than 4000 $m^2/m^3$, greater than 4500 $m^2/m^3$, greater than 5000 $m^2/m^3$, greater than 5500 $m^2/m^3$, greater than 6000 $m^2/m^3$, greater than 6500 $m^2/m^3$, greater than 7000 $m^2/m^3$, greater than 7500 $m^2/m^3$, greater than 800 $m^2/m^3$, greater than 8500 $m^2/m^3$, greater than 9000 $m^2/m^3$, greater than 9500 $m^2/m^3$, or about 10,000 $m^2/m^3$, or a combination of any of the foregoing values, or a range encompassing any of the foregoing values.

In a further aspect, the semipermeable membrane can be made from an amorphous polymer and the outer tube can be made from a fluorinated ethylene propylene polymer. In some aspects, the compact membrane reactor has a length of from about 0.25 m to about 10 m, or of about 0.25 m, 0.5 m, 0.75 m, 1 m, 1.25 m, 1.5 m, 2 m, 2.5 m, 3 m, 3.5 m, 4 m, 4.5 m, 5 m, 5.5 m, 6 m, 6.5 m, 7 m, 7.5 m, 8 m, 8.5 m, 9 m, 9.5 m, or about 10 m, or a combination of any of the foregoing values, or a range encompassing any of the foregoing values. In a further aspect, the compact membrane reactor can have a length of from about 0.5 m to about 3 m. In one aspect, the compact membrane reactor has a length of about 1 m.

In one aspect, the semipermeable membrane has an inner diameter of from about 0.001 to about 0.1 in, or from about 0.005 to about 0.05 in, or of about 0.001, 0.005, 0.01, 0.05, or about 0.1 in, or a combination of any of the foregoing values, or a range encompassing any of the foregoing values. In another aspect, the compact membrane reactor, when configured as a wrapped coil, has a diameter of from about 1 cm to about 5 cm, or has a diameter of about 1 cm, 1.5 cm, 2 cm, 2.5 cm, 3 cm, 3.5 cm, 4 cm, 4.5 cm, or about 5 cm, or a combination of any of the foregoing values, or a range encompassing any of the foregoing values.

In one aspect, the means for controlling the magnetic field within the reactor can be a radio frequency coil. In another aspect, the means for controlling the magnetic field within the reactor can be a shielding mechanism to reduce the influence of Earth's magnetic field. Further in this aspect, such a shielding mechanism can allow access to a microTesla magnetic field in the reactor. In still another aspect, the means for controlling the magnetic field within the reactor can be a solenoid powered with a direct current to establish the desired magnetic field. In yet another aspect, the means for controlling the magnetic field can be a permanent magnet array. In another aspect, the means for controlling the magnetic field can be a superconducting magnet. In some aspects, two or more of these means for controlling the magnetic field can be used simultaneously or sequentially. In one aspect, the ideal magnetic field can be selected based on the details of the chemical system and the spin physics of the hyperpolarization transfer process from parahydrogen to other nuclei. In one aspect, the shielding mechanism is or incorporates mu-metal. In a further aspect, mu-metal is a nickel-iron soft ferromagnetic alloy with very high permeability useful in shielding applications. A non-limiting example of a mu-metal composition can be 77% nickel, 16% iron, 5% copper, and 2% chromium or molybdenum. A second non-limiting example of a mu-metal composition can be 80% nickel, 5% molybdenum, small amounts of silicon and/or other elements, and the remaining 12 to 15% iron. Other compositions are also envisioned. In some aspects, the shielding mechanism can be a commercial product such as, for example, a Twinleaf MS-1L compact magnetic shield (Twinleaf LLC).

Method for Generating High Spin Polarization

In another aspect, disclosed herein is a method of using the compact membrane reactor disclosed herein to generate high spin polarization of a spin ½ nucleus in a sample, the method comprising introducing (e.g., injection, pumping) a solution comprising the sample through the inner tube, introducing parahydrogen through the outer tube, and applying a current to the means for controlling the magnetic field to generate a magnetic field. In one aspect, the spin ½ nucleus can be selected from $^1$H, $^{13}$C, $^{15}$N, $^{19}$F, $^{31}$P, or a combination thereof. In one aspect, the high spin polarization of the sample can be generated by a hydrogenation reaction. In an alternative aspect, the high spin polarization of the sample can be generated by signal amplification by reversible exchange.

In some aspects, the solution containing the sample also includes a polarization transfer catalyst. In an alternative aspect, the polarization transfer catalyst can be immobilized on a solid support. In aspects when there is a solid support, it can be silica particles, the semipermeable membrane of the reactor, or a combination thereof.

In one aspect, the current applied to the means for controlling the magnetic field has a frequency of from about 0 Hz to about 300 GHz, or of from about 0 Hz to about 1 GHz. In another aspect, the current has a frequency of about 100 kHz, 200 kHz, 300 kHz, 400 kHz, 500 kHz, 600 kHz, 700 kHz, 800 kHz, 900 kHz, 1 MHz, 100 MHz, 200 MHz, 300 MHz, 400 MHz, 500 MHz, 600 MHz, 700 MHz, 800 MHz, 900 MHz, 1 GHz, 100 GHz, 200 GHz, or about 300 GHz, or a combination of any of the foregoing values, or a range encompassing any of the foregoing values. In one aspect, the frequency is about 400 kHz or is about 1 GHz. In another aspect, the current is a direct current.

In some aspects, multiple compact membrane reactors can be arranged and used in parallel.

Hyperpolarization Membrane Reactor Batch Flow Control System

In some aspects, disclosed herein is a sample preparation system having at least one compact membrane reactor and a fluid handling apparatus. In a further aspect, the fluid handling apparatus can be a batch mode fluid handling apparatus. In some aspects, the batch mode fluid handling apparatus includes a catalyst-removal unit. In a further aspect, an exemplary catalyst-removal unit can be a column having a first medium, wherein the first medium can, in some aspects, be thiol-doped silicon microparticles. In another aspect, the column can further contain a second medium. In some aspects, the second medium can be high iridium affinity MoS$_2$ extraction sheets. In an alternative aspect, the first medium or the second medium or both can be a nano-filtration membrane. In a further aspect, the nano-filtration membrane can have a molecular weight cut off (MWCO) of from about 150 Da to about 1000 Da, or of about 150, 200, 250, 300, 350, 400, 450, 500, 550, 600, 650, 700, 750, 800, 850, 900, 950, or about 1000 Da, or a combination of any of the foregoing values, or a range encompassing any of the foregoing values. Other filtration means and downstream purification methods, including, but not limited to, solvent switching, catalyst removal, and combinations thereof are also envisioned and should also be considered disclosed.

Turning now to FIG. 1, disclosed herein is a flow control schematic 102 for batch processing as disclosed herein, including control unit 104 which is used to select pre-programmed parameters for hyperpolarization, a sterile cartridge window 106 wherein a pre-packaged isotopically labeled target substrate is inserted; purification unit 108 for purification of hyperpolarized substrate solution, and sample dispensing unit 110 for dispensation of sample into a sterile vial for easy injection in a batch process.

Internal to the batch processing unit is a tube-in-tube reactor configured as follows (see also FIG. 3 for a cross-sectional view). Sample mixture is pumped to a tube-in-tube reactor containing a surrounding layer of FEP tubing and a core layer of porous Teflon AF-2400 tubing and through the core layer of Teflon AF-2400 tubing. The tube-in-tube reactor is surrounded by a means for controlling the magnetic field configured to hyperpolarize p-H$_2$ found in the surrounding FEP tubing; p-H$_2$ permeates the Teflon AF-2400 tubing and can induce hyperpolarization in the sample of interest. Treated sample exits the reactor and proceeds through an exchangeable purification column and into a sample dispensing unit for dispensation into a sterile vial.

Figure 2:
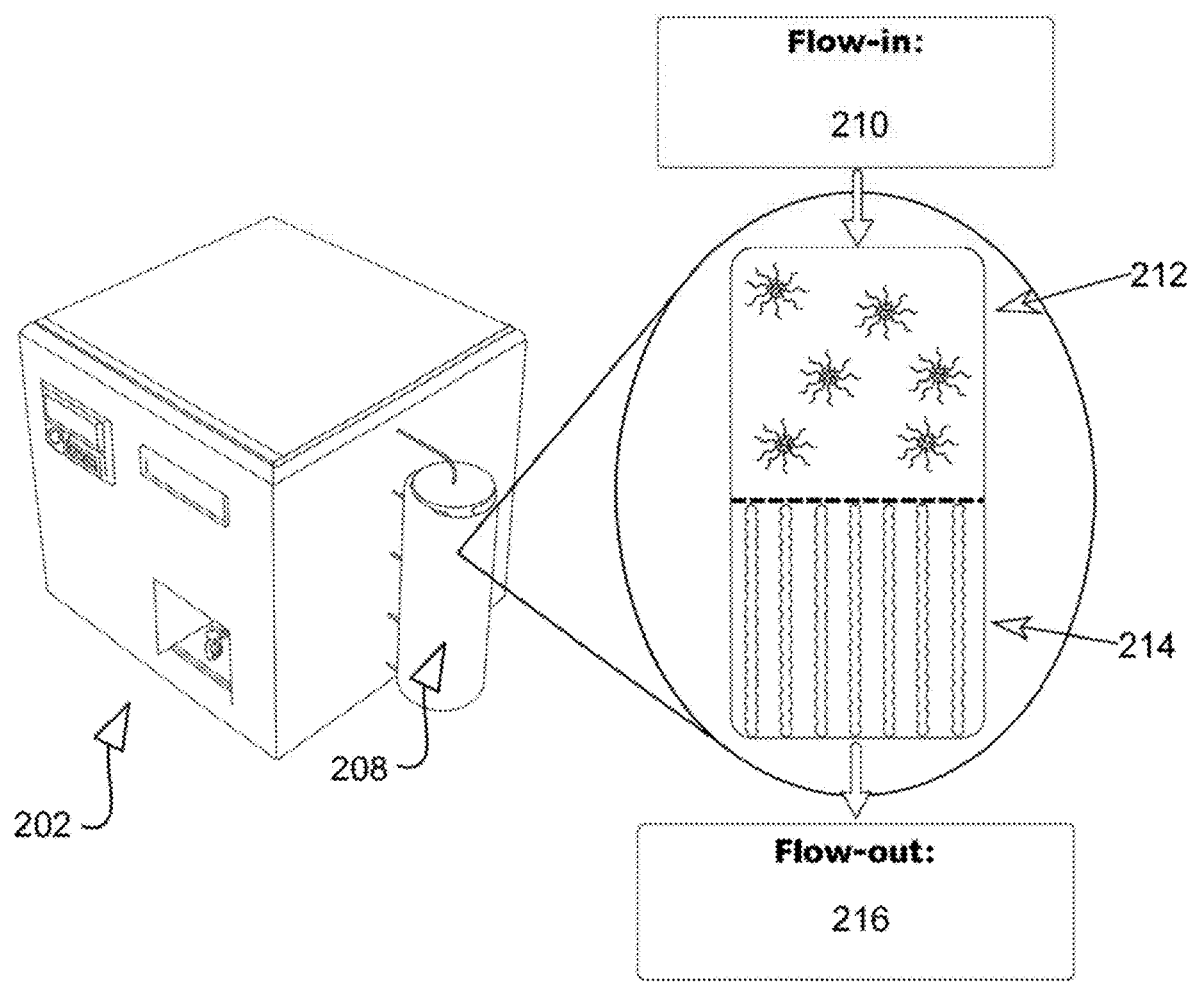
FIG. 2 shows a schematic of an exemplary exchangeable column that can, in some aspects, be used as part of the basic hyperpolarization unit of FIG. 1. In this particular aspect, a two-phase purification system uses thiol-doped silicon microprarticles with high iridium affinity and a plurality of high iridium affinity $MoS_2$ extraction sheets in order to obtain a safe, injectable hyperpolarized substrate solution free of toxic catalyst. Inflow into the unit includes a hyperpolarized catalyst and biotracer solution, while outflow includes a safe, injectable hyperpolarized biotracer solution. Other filtration means can be used in addition to or in place of those depicted.

FIG. 2 shows an expanded view of exchangeable column 208, which forms a part of flow control unit 202. Flow-in 210 to the unit includes, in one aspect, hyperpolarized catalyst and biotracer solution. The first phase 212 of filter media includes iridium affinity thiol-doped silicon microparticles, while the second phase 214 includes high iridium affinity MoS$_2$ extraction sheets. Finally, flow-out 216 exiting from exchangeable column 208 consists of safe, injectable hyperpolarized biotracer solution from which toxic catalyst has been removed. In some aspects, other filtration means can be used instead of, or in addition to, those shown, including the nano-filtration membranes discussed previously.

In one aspect, the batch processing unit can be compact. In a further aspect, the batch processing unit can have dimensions of about 2 ft×2 ft×2 ft. In another aspect, the batch processing unit can be configured to accept sterile, ready-to-use cartridges of contrast agents such as, for example, vitamins, FDA-approved drugs, metabolites, and the like. In still another aspect, the batch processing unit requires no advanced technical training and is compatible with existing MRI systems.

In one aspect, when the purification unit is an exchangeable column, the exchangeable column can contain a two-phase purification system (see FIG. 2). Further in this aspect, in the first phase, iridium-affinity thiol-doped silicon microparticles can remove more than 98% of SABRE catalyst from solution. In another aspect, in the second phase, high iridium affinity MoS$_2$ captures residual levels of catalyst. In either of these aspects, an initial or additional extraction technique may also be used including, but not limited to, a nano-filtration membrane such as those discussed previously. In one aspect, hyperpolarized catalyst and biotracer solution enters the exchangeable column, is processed through the two filter phases, and a safe, injectable hyperpolarized biotracer solution free of toxic catalyst flows out of the column. In an alternative aspect, the reaction can be performed with catalyst particles immobilized on a solid surface and the biotracer solution flowing over the surface. In any of the above aspects, the amount of iridium remaining in the solution that has been filtered or purified is as low as the ppb range. In an alternative aspect, other purification units and systems including, but not limited to solvent switching systems, catalyst removal systems, and the like, as well as combinations of such purification units and systems, can be used instead of or in addition to an exchangeable column.

In another aspect, although the catalysts useful herein have not been shown to have acute cytotoxicity, removal may be useful in preventing residual toxicity and/or buildup in patients, thereby making repeated scans possible. In another aspect, the processes and reactor disclosed herein do not require shaking to produce an emulsion to transfer hyperpolarization. In one aspect, shaking results in large residual amounts of toxic catalyst in solution as well as residual toxic chloroform, rendering shaking methods unsuitable for biological applications.

Hyperpolarization Membrane Reactor Continuous Flow Control System

Figure 3:
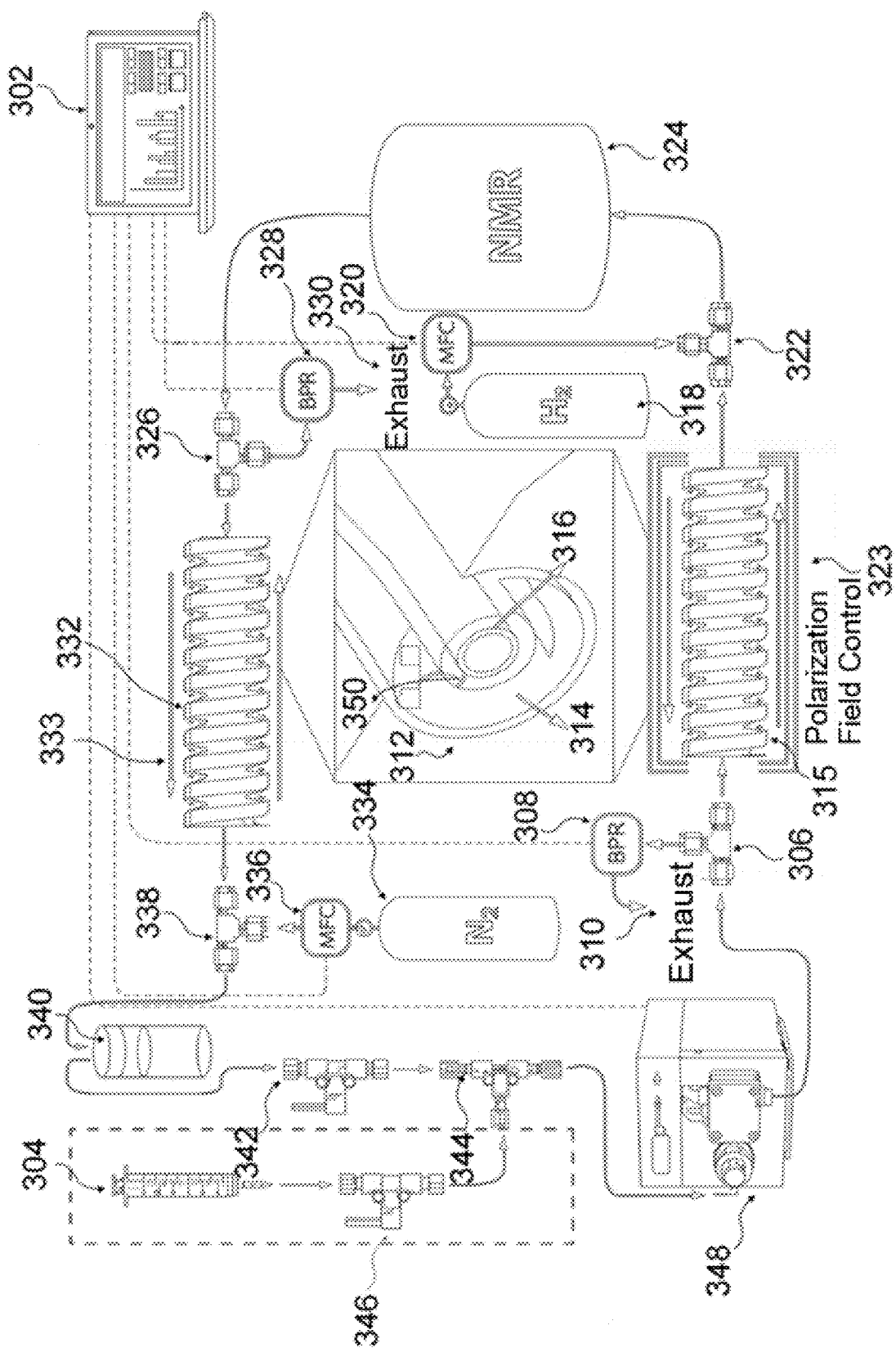
FIG. 3 shows a schematic of an exemplary continuous flow chemistry approach for a signal amplification by reversible exchange (SABRE) according to one aspect of the present disclosure. Solid black lines correspond to fluidic paths and grey dashed lines indicate signal communication with a computer. Solid gray lines indicate the flow of nitrogen gas and/or hydrogen gas. MFC=mass flow controller and BPR=back pressure regulator.

Turning now to FIG. 3, in one exemplary aspect, disclosed herein is a flow control schematic for continuous flow chemistry for the SABRE hyperpolarization process. Solid black lines correspond to fluid path and grey dashed lines indicate signal communication with computer 302. Solid gray lines indicate the flow of nitrogen and/or hydrogen gas. A sample mixture of polarization transfer catalyst, solvent, and target substrate 304 is injected through valve 346, joining the flow from degassing reactor 340 through valve 342 at valve 344 into pumping unit 348 and then through valve 306. Separately, hydrogen supply 318 flows through mass flow controller 320, through valve 322, and through the tube-in-tube reactor 323, through valve 306, through back pressure regulator 308, and to exhaust 310. Sample mixture is pumped to a tube-in-tube reactor 323 (see inset for a cross-section 312), wherein the tube-in-tube reactor includes a surrounding layer or annulus of FEP tubing 314 and a core layer of porous Teflon AF-2400 tubing 316 (inset) having diameter 350 (in this case about 250 µm). Sample mixture moves through the core layer or annulus of Teflon AF-2400 tubing. The tube-in-tube reactor 323 is surrounded by means for controlling the magnetic field (such as, for example, an RF coil or other means disclosed herein) 315 (and/or means for controlling the magnetic field 332 for tube-in-tube reactor 333) configured to hyperpolarize p-$H_2$ found in the surrounding FEP tubing; p-$H_2$ permeates the Teflon AF-2400 tubing and can induce hyperpolarization in the sample of interest. Treated sample exits the tube-in-tube reactor and proceeds through valve 322 and into low-field NMR magnet 324, wherein sample analysis can occur. Following analysis, material exits NMR unit 324 and proceeds through valve 326 which connects to back pressure regulator 328 and further to exhaust system 330. Sample then proceeds through a second tube-in-tube reactor 333 with the same structure as cross section 312, wherein p-$H_2$ that has converted to ortho-hydrogen (o-$H_2$) can be replaced. Material from the second reactor passes through valve 338 and into degassing reactor 340 where it can be recycled in reactor 304 for further analysis. Separately, inert gas supply 334 flows through mass flow controller 336, through valve 338, through radio frequency coil or other means for controlling magnetic field strength 332, through valve 326, through back pressure regulator 328, and out at exhaust 330.

In one aspect, the low-field NMR magnet can have a frequency such as, for example, 43 MHz. In another aspect, the low-field NMR magnet is configured to detect the level of hyperpolarized enhancement and then the sample is returned to a reservoir via degassing reactor 340. In some aspects, the second tube-in-flow reactor is important in the overall continuous flow platform to displace p-$H_2$ that has been converted to o-$H_2$ in the SABRE process, thereby allowing full refreshment of p-$H_2$ in the primary reactor 323. In some aspects, the primary reactor containing p-$H_2$ flow can be placed in either an mT solenoid or magnetic shielding to access $^1H$ or heteronuclear (e.g., $^{15}N$ or $^{13}C$) hyperpolarization, respectively. In some aspects, any membrane reactor disclosed herein can be equipped with a means for polarization field control.

In any of the above aspects, the continuous flow process can be microfluidic. Also disclosed are samples prepared by any of the methods and using any of the reactors disclosed herein. In some aspects, the samples are substantially free of polarization transfer catalyst. In one aspect, a sample free of polarization transfer catalyst can safely be injected into a human or animal subject for aid in MRI imaging. In one aspect, a sample for injection into a patient for use in MRI imaging can first be analyzed by NMR. Further in this aspect, NMR analysis can be used for quality assurance and/or quantification of hyperpolarization level prior to injection.

In some aspects, the continuous flow process can be run as a stopped-flow process or a segmented flow process. In any of these aspects, the disclosed hyperpolarization reactor can be coupled with additional or alternative solvent mixing, filtration, doping, or other sample processing devices or units known in the art.

Additional Components for Batch and Continuous Flow Apparatuses

In any of the above aspects, the continuous flow process or the batch flow process as disclosed herein can be accomplished on an apparatus also containing one or more gas displacement systems. In some aspects, the gas displacement system can be an inert gas degassing reactor, a depressurization stage, or a combination thereof.

In another aspect, the reactor or continuous or batch flow system disclosed herein further includes a temperature control device. In one aspect, the temperature control device can heat or cool any part of the fluid path of the reactor and/or fluid handling system.

In still another aspect, the reactor or continuous or batch flow system disclosed herein further includes a means for generating a turbulent flow. In a further aspect, the means for generating a turbulent flow can include, for example, the insertion of inert materials to disrupt the fluid path through the disclosed reactor. Further in this aspect, random or systematic disruptions of the fluid path can result in turbulent flow dynamics.

In any of the above aspects, the reactors or continuous or batch flow systems disclosed herein include at least one means for controlling the magnetic field to which the reactor is exposed. In a further aspect, the means for controlling the magnetic field can include increasing the strength of the magnetic field or of shielding the magnetic field. In a still further aspect, the magnetic field can be shielded to where the sample experiences a lower magnetic field than the earth's magnetic field. In one aspect, the means for controlling the magnetic field can be a permanent magnet, an electromagnet, a superconducting magnet, magnetic shielding, or a combination thereof.

Biomedical Applications of the Parahydrogen Hyperpolarization Membrane Reactor

In one aspect, the reactor and process disclosed herein can be used to produce hyperpolarized biotracers for imaging applications. In one aspect, the membrane-based flow reactor disclosed herein enables delivery of parahydrogen to solution in-line. In another aspect, the small size and low cost of the disclosed systems enable parallelization for rapid, efficient hyperpolarization in batch preparation of sterile, injectable outputs with discrete fluid handling. In an alternative aspect, the membrane reactor disclosed herein enables a continuous stream of hyperpolarized material for biomedical imaging, enabling the observation of steady-state metabolism, which has not been possible using known techniques.

Additional Applications of the Parahydrogen Hyperpolarization Membrane Reactor

In one aspect, the reactor and process disclosed herein can be used for high sensitivity chemical analysis of complex mixtures. In another aspect, the reactor and process disclosed herein can be used as a research tool to characterize molecular interactions. In still another aspect, the reactor and process disclosed herein can be used to make precision measurements for navigation systems not relying on global positioning system (GPS) satellites. In yet another aspect, the reactor and process disclosed herein may be useful in quantum computing, by producing entangled spin states with high purity and infinite coherence times. In one aspect, the reactor and process disclosed herein can be used in radiowave amplification by stimulated emission of radiation (RASER)-based gyroscopes. In a further aspect, the reactor and process disclosed herein can be coupled to low-field, low-cost MRI scanners that can be used to expand imaging to everyday clinical settings, developing countries, and the like.

Also disclosed herein is a method for continuous detection of RASER effects in a sample using a an NMR spectrometer, the method including at least the steps of subjecting the sample to the disclosed hyperpolarization methods and analyzing the sample using the NMR spectrometer. In one aspect, the RASER effects are observable when parahydrogen pressure in the outer tube of the hyperpolarization reactor is about 90 psi (620.5 kPa). In another aspect, RASER effects are observable when the sample is introduced through the inner tube at a rate of from about 0.01 mL/min to about 10 mL/min, or from 2.0 mL/min to about 4.5 mL/min, or at about 0.01, 0.05, 0.1, 0.5, 1, 1.5, 2, 2.5, 3, 3.5, 4, 4.5, 5, 5.5, 6, 6.5, 7, 7.5, 8, 8.5, 9, 9.5, or about 10.5 mL/min, or a combination of any of the foregoing values, or a range encompassing any of the foregoing values.

In another aspect, RASER effects are observable in the disclosed methods for a period of time longer than the $T_2$ relaxation time for protons in the sample, or for a period of from about 1 minute to about 7 days, or from about 1 minute to about 3 days, or from about 1 minute to about 24 hours, or from about 1 minute to about 1 hour, or from about 1 minute to about 10 minutes, or for 1, 2, 3, 4, 5, 6, 7, 8, 9, 10, 20, 30, 40, 50, or about 60 minutes, or for about 2, 3, 4, 5, 6, 7, 8, 9, 10, 11, 12, 13, 14, 15, 16, 17, 18, 19, 20, 21, 22, 23, or about 24 hours, or for about 2, 3, 4, 5, 6, or about 7 days or a combination of any of the foregoing values, or a range encompassing any of the foregoing values. In still another aspect, the RASER effects are observable when the NMR spectrometer has a field strength of from about 1 T to about 10 T, or of about 1, 2, 3, 4, 5, 6, 7, 8, 9, or about 10 T, or a combination of any of the foregoing values, or a range encompassing any of the foregoing values. In one aspect, the NMR has a field strength of about 1.1 T, or of about 9.4 T.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Hyperpolarization Reactor System Components

The developed flow chemistry platform for SABRE hyperpolarization process is proposed in FIGS. 1-3. Initial solution (e.g., pyridine and pyrazine) is prepared and loaded to the syringe in oxygen and moisture free condition. Computer controlled continuous pump (Azure P4.1S, Knauer) was used to deliver the solution to a vial and the compact tube-in-tube reactor. The tube-in-tube reactor is constructed with a transparent Teflon fluorinated ethylene propylene (FEP) tubing (Outer annulus, OD: 0.125", ID: 0.0625", Microsolv Technology Corp.) and a gas-permeable AF-2400 tubular membrane (Inner annulus, OD: 0.04", ID: 0.032", Biogeneral Inc.). Detailed components and steps for constructing the tube-in-tube reactor can be found in Han et al. The gas delivery conditions (e.g., pressure and rate) to the tube-in-tube reactor was controlled by two mass flow controllers (MFC, EL-Flow series, Bronkhorst) and back pressure regulator (BPR, EL-Press series, Bronkhorst) for both hydrogen and nitrogen delivery. MFCs and BPRs were monitored and controlled with custom made LabVIEW code.

Example 2: Hyperpolarization Reactor System Magnetic Field Control

Magnetic field control of the SABRE hyperpolarization process in the disclosed hyperpolarization reactor system is achieved using either a hand-wrapped solenoid for $^1H$ hyperpolarization or magnetic shielding for heteronuclear (e.g. $^{13}C$, $^{15}N$) experiments.

$^1H$ SABRE Field Control

For $^1H$ SABRE experiments with detection at 1.1 T (Spinsolve), a 25 cm hand-wrapped solenoid for magnetic field control of the hyperpolarization reactor system is wrapped with 17 layers of 20 AWG stranded hook-up wire. For a coiled reactor length of 10.2 cm, the variation of the magnetic field over the entire reactor length centered in the solenoid is −0.1 mT, where polarization transfer efficiency for common compounds (e.g. pyridine, pyrazine) with SABRE varies on a magnetic field order of 1 m.

For a scaled-up version of the reactor with coiled length 19.8 cm, the same coil was used, but the variation of the magnetic field over the reactor was much larger, with the edges of the reactor experiencing a −1 mT variation in field. For this reactor, achieving homogeneity is more difficult due to the proportionality of the solenoid length to the coiled reactor length. Centering the reactor in the solenoid results in magnetic field differences near the edges of the reactor, which will decrease polarization transfer efficiencies as the spin system moves away from the ideal level anti-crossing. For example, the polarization transfer efficiency of pyridine decreases about 20% with a ~1 mT variation in magnetic field. The length constraint of our solenoid was restricted by hardware and materials considerations in construction of the entire hyperpolarization reactor system. A redesign of the entire system in further generations could yield a more efficient magnetic field control for $^1H$ hyperpolarization.

Heteronuclear SABRE-SHEATH Field Control

SABRE-SHEATH, or heteronuclear hyperpolarization with SABRE, is achieved in the hyperpolarization reactor system with a single layer solenoid positioned inside a custom-sized 3-layer magnetic shield with 5 in OD×10 in L and removable covers on both ends (Magnetic Shield Corp.). Each cover has a centered 1.25 in through-hole to allow for the fluid line access through the shielding. The single layer solenoid used is restricted in length by the inner length of the shielding. In addition, a wire is wrapped around the tubing that exits the shielding to provide a guiding field and avoid zero-crossings as the hyperpolarized solution exits the reactor and is pumped toward the sensitive volume.

For $^{13}C_2$-pyruvate hyperpolarization experiments, the 10.2 coil length reactor is used, while for $^{15}N_3$ metronidazole experiments the 19.8 cm reactor is used. This discrepancy is due to the limitation in the homogeneity of the magnetic field control from the solenoid and magnetic field. The polarization transfer field (PTF) of $^{15}N_3$ metronidazole has a very broad field dependence, in contrast to the narrow field dependence of pyruvate that varies on a 0.1 µT magnitude T$_1$ Relaxation and SABRE Buildup Dynamics The T$_1$ relaxation and hyperpolarization buildup dynamics have a significant effect on the observed polarization due to the retention time in the reactor and the transfer time from the reactor to the sensitive volume. The data acquired for pyrazine, pyridine, and pyruvate and the calculated fits are shown in the following sections.

Pyrazine T$_1$ and SABRE Buildup

Figures 6A, 6B:
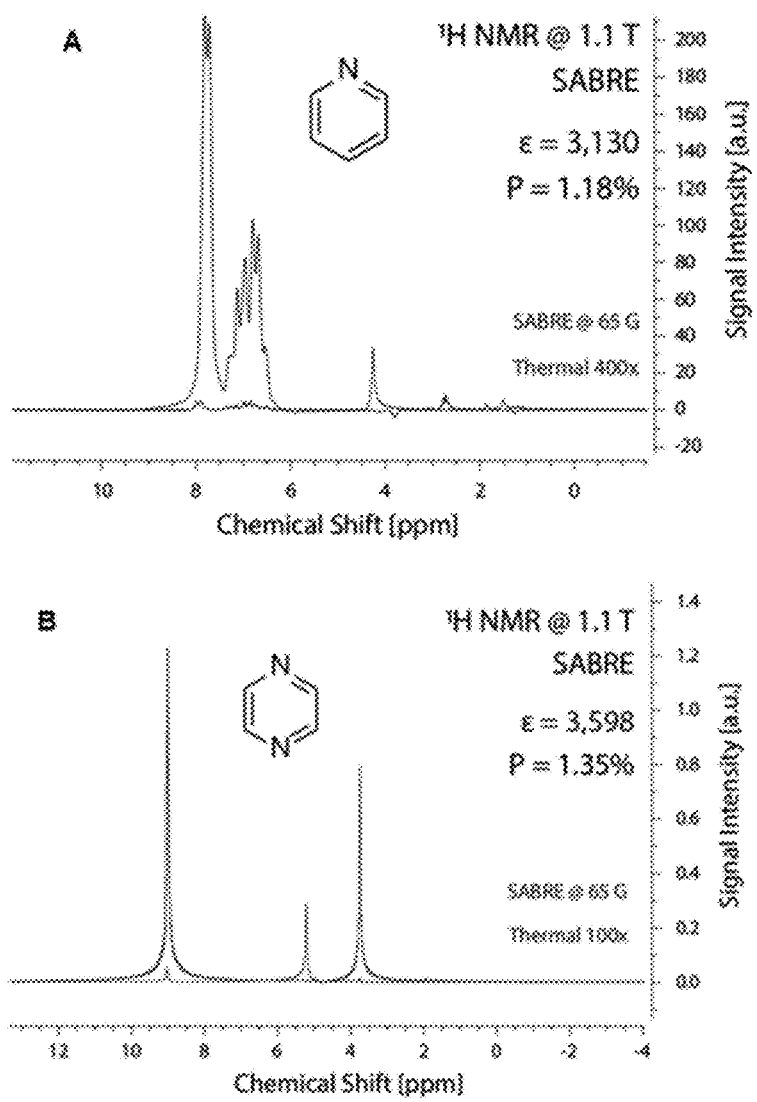
FIGS. 6A-6B show polarization data acquired with an exemplary parahydrogen hyperpolarization membrane reactor for both pyridine (FIG. 6A) and pyrazine (FIG. 6B); sample composition for both spectra shown is 60 mM substrate+3 mM IMes catalyst. Data is acquired in flow at 2 mL/min with a hydrogen pressure of 90 psi.
Figures 10A, 10B:
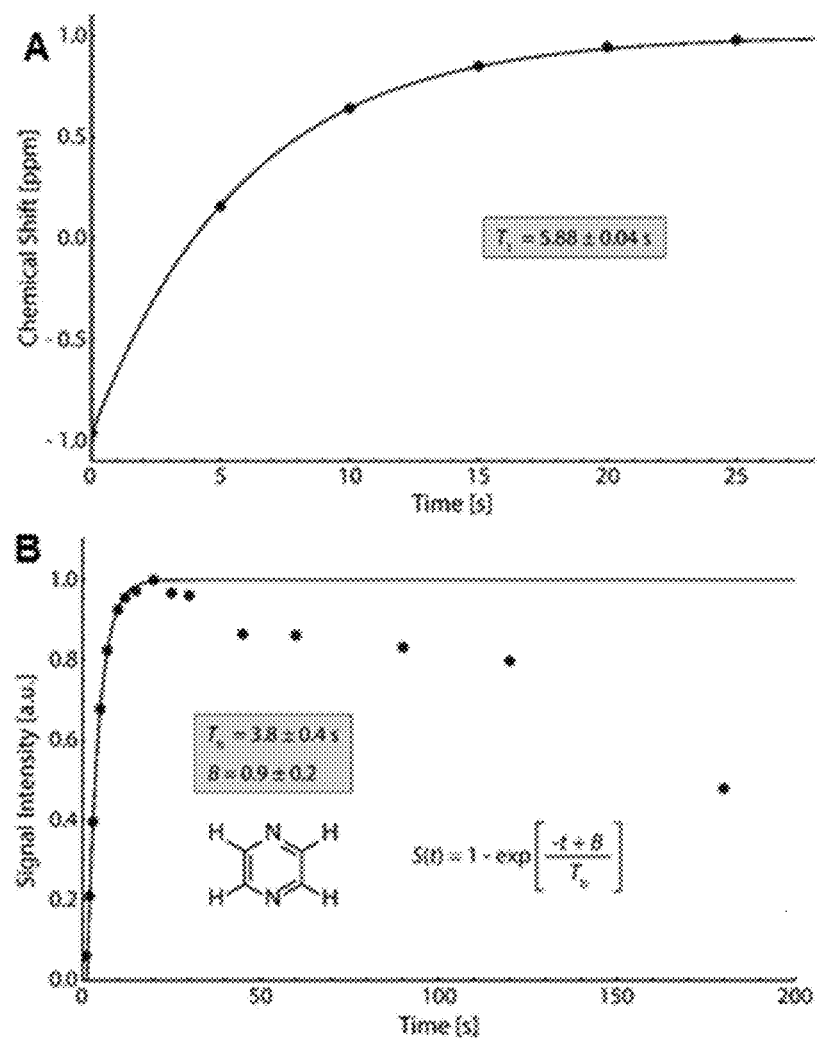
FIGS. 10A-10B show (FIG. 10A) $T_1$ inversion recovery experiment on pyrazine at 1.1 T and (FIG. 10B) SABRE hyperpolarization buildup on pyrazine using varied bubbling times.

For pyrazine, the SABRE hyperpolarization buildup is measured using a pneumatic shuttling system and detected at 9.4 T (Bruker). T$_1$ relaxation data is acquired at 1.1 T (Spinsolve) using a standard inversion recovery experiment. (See also FIGS. 6B and 10A-10B.)

Pyridine T$_1$ and SABRE Buildup

Figures 11A, 11B:
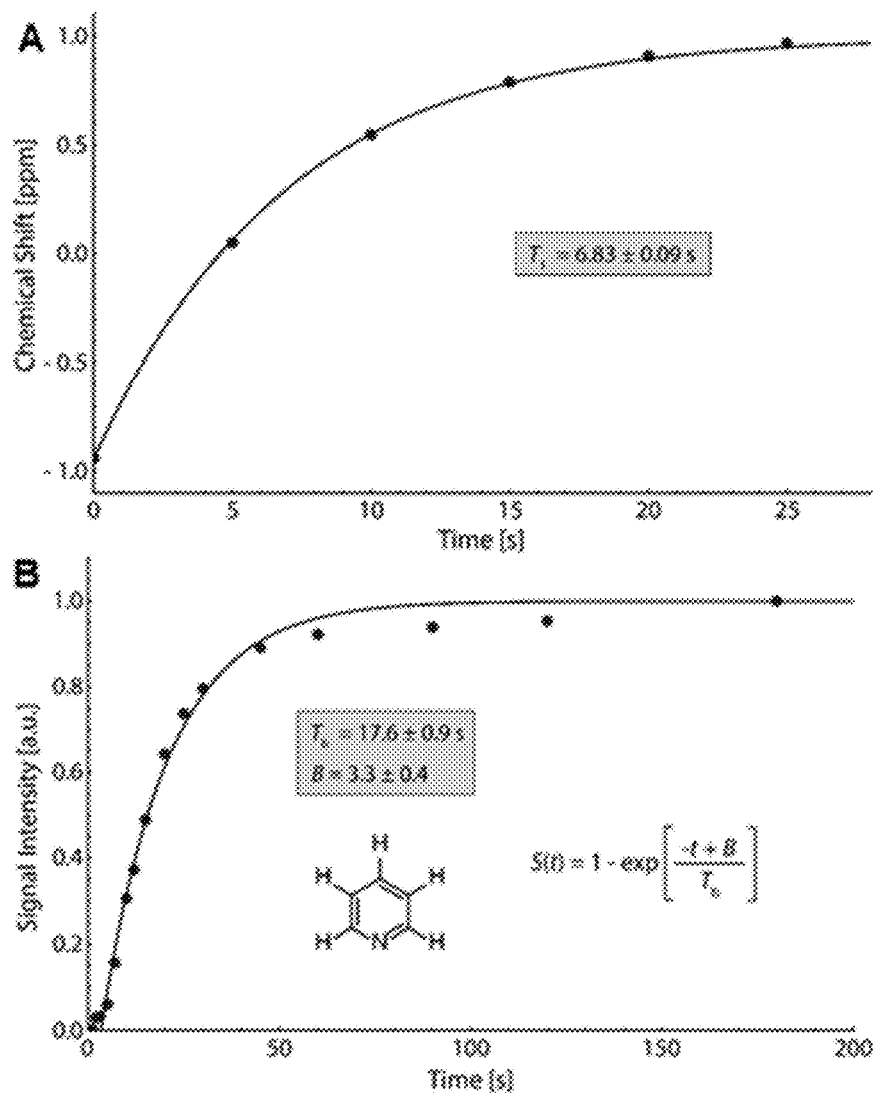
FIGS. 11A-11B show (FIG. 11A) $T_1$ inversion recovery experiment on pyridine at 1.1 T and (FIG. 11B) SABRE hyperpolarization buildup on pyridine using varied bubbling times.

For pyridine, the SABRE hyperpolarization buildup is measured using a pneumatic shuttling system and detected at 9.4 T (Bruker). T$_1$ relaxation data is acquired at 1.1 T (Spinsolve) using a standard inversion recovery experiment. (See also FIGS. 6A and 11A-11B.)

Pyruvate SABRE Buildup

Figures 12A, 12B:
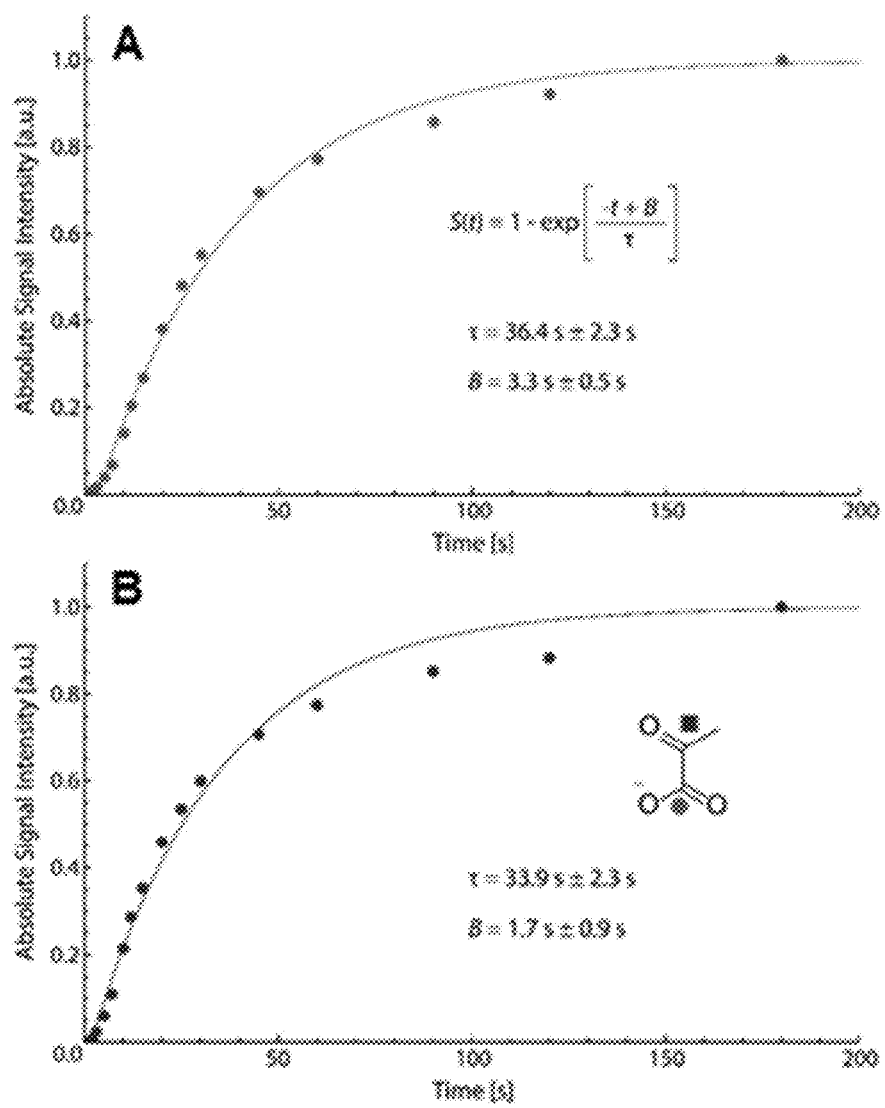
FIGS. 12A-12B show $^{13}C_2$ pyruvate hyperpolarization buildup with SABRE using varied bubbling times, measured at 9.4 T using pneumatic shuttling.

For pyruvate, the SABRE hyperpolarization buildup is measured using a pneumatic shuttling system. T$_1$ relaxation data for hyperpolarized $^{13}C_2$ pyruvate can be found in previous literature. (See also FIGS. 7 and 12A-12B.)

High Field (9.4 T) Adapted Hyperpolarization Reactor System Apparatus

The disclosed hyperpolarization reactor system can be simply adapted to a high-field magnet or any magnet that only allows access to one side of the magnet bore. This is achieved through modification of the transfer line from the reactor and the return line, using a capillary passed through a T-junction into a ⅛ in PTFE line to pump in the solution quickly through the inner tube, and then return the solution through the outer ⅛ in line through the degassing reactor and into the hyperpolarization reactor system reservoir.

Example 3: RASER Data Processing

In this section, we describe the processing of single mode RASER data that has some sort of magnetic field drift incorporated. In the RASER spectra that are acquired at 1.1 T, significant drift of the NMR peak is observed due to magnetic field drift from the use of a temperature compensated permanent magnet array for the Bo field. We show how this drift can be extracted from the raw data and then subtracted to obtain a pure drift-compensated Fourier transform (FFT) of the RASER. This single-mode compensation differs from previously described dual-mode compensation methods published in earlier parahydrogen-pumped RASER works in that it relies on small slices of the overall RASER spectra to generate a compensation equation, instead of correcting for the relative differences in drift between two RASER lines. All operations for this data processing are performed using Mathematica. To demonstrate this data processing, the following operations are detailed and results shown for the 157.2 s RASER acquisition at 1.1 T shown in FIG. 9.

Drift Fitting—FT Slicer

Figures 13A, 13B:
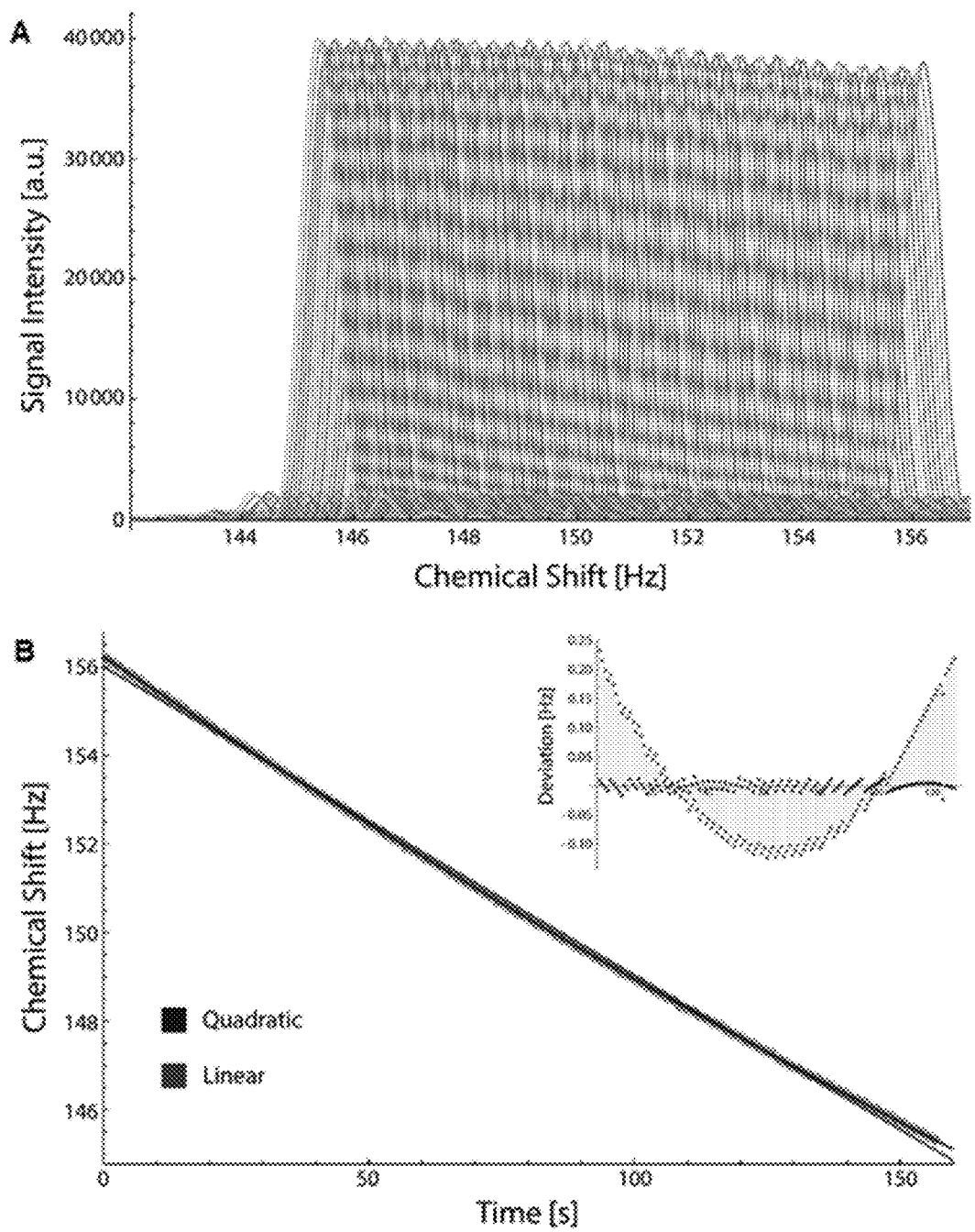
FIG. 13A shows Individual FFT of 128 slices of the 157.2 s time domain from FIG. 6 of the main text. Each slice has a time width of 1.229 s and a point width of 1024 pts. Each FFT slice is additionally padded with zeros on the right side of the time domain, giving a total number of 32768 points in the time domain of each slice.
FIG. 13B shows quadratic and linear fits and the respective fit residuals for identified peaks relative to the median time of each slice.

We use a simple code to slice up a RASER spectrum in the time domain, allowing for each slice to be transformed separately. FIG. 13A shows an overlay of 128 FFT slices. To smooth the FFT of each slice and allow for identification of the peak frequency, we apply additional zero-filling to each of the 128 slices of the 131072-point time domain such that each slice has 32768 pts.

Each FFT slice can then be extracted as a peak frequency, identifying the frequency of the NMR peak with respect to the time of the FFT slice. This peak selection is then plotted with respect to the median of the time of each slice. This drift curve is fit to both linear and quadratic functions. The linear and quadratic function fits are shown in FIG. 13B as the overlay over the peak frequency points, with the residuals shown as inset. The resulting linear and quadratic fit equations are given as Eq. 1 and Eq. 2, respectively. Minimization of the residuals clearly yields a quadratic fit for the magnetic field drift. Here, the intercept 156 Hz is first position of the RASER line, and the linear and quadratic terms have units of s$^{-2}$ and s$^{-3}$, respectively.

$$156-0.0693x \qquad \text{Eq. 1}$$

$$156-0.0780x+0.0000551x^2 \qquad \text{Eq. 2}$$

RASER Correction in FFT

To correct the time domain data with the fits obtained using the method above, we multiply the complex data by a table containing the drift correction. For example, the real data is given by Eq. 3, where m and n are the drift coefficients.

$$\text{data}_{uncorr}=e^{-i(\omega_0+mt+nt^2)t} \qquad \text{Eq. 3}$$

By multiplying Eq 3 by only the drift component, we obtain the corrected data isolated to only the NMR frequency (Eq 4).

$$\text{data}_{corr}=e^{-i(\omega_0)t}=e^{-i(\omega_0+mt+nt^2)t}e^{i(mt+nt^2)t} \qquad \text{Eq. 4}$$

In this equation, the additional π coefficients are derived from the transformation between frequency and phase, corresponding to the correction terms of Eq. 3. This connection arises as the relation between frequency and phase is given by, $$v(t)=\frac{1}{2\pi}\frac{d\varphi}{dt} \qquad \text{Eq. 5}$$

So therefore, $$\varphi(t)=2\pi\int v(t)dt \qquad \text{Eq. 6}$$

Then, if the frequency term is given by an expansion such that, $$v(t)=a_0+a_1t+a_2t^2+a_3t^3+\ldots \qquad \text{Eq. 7}$$

Phase is then equal to the corresponding terms, $$\varphi(t) = 2\pi\left(a_0 t + \frac{1}{2}a_1 t^2 + \frac{1}{3}a_2 t^3 + \frac{1}{4}a_3 t^4 + \ldots\right) = \qquad \text{Eq. 8}$$
$$2\pi t\left(a_0 + \frac{1}{2}a_1 t + \frac{1}{3}a_2 t^2 + \frac{1}{4}a_3 t^3 + \ldots\right)$$

Reexamining Eq. 3, as the $\omega_0$ term already incorporates a factor of $2\pi$, m and n must then contain the correct coefficient of $\pi$ such that, $$m = \frac{2\pi}{2}q_1 \qquad \text{Eq. 9a}$$

$$n = \frac{2\pi}{3}q_2 \qquad \text{Eq. 9b}$$

Where $q_1$ and $q_2$ are the coefficients given by the fitting in the Drift Fitting—FT Slicer discussion above. Now the correction can be applied with the correct coefficients, yielding the linear and quadratic corrected FFTs.

Clearly, fitting with a quadratic to minimize the residuals yields a full collapse of the RASER drift into a single line, corresponding to the exact RASER spectrum of pyrazine for this data. Sinc artifacts are seen in the FFT as the peak corresponds to a full transform of the entire rectangular time domain without apodization. These artifacts can be corrected through application of a Hann windowing function in the time domain before FFT, yielding the corresponding frequency domain spectra with respective linear and quadratic corrections.

FWHM Calculation

The theoretical maximum full width half maximum (FWHM) of an NMR acquisition is given by the Fourier transform of the time domain shape and length. For a rectangular time domain (no apodization), the signal shape can be represented mathematically by a rectangular function, $$\text{rect}(x/L) \qquad \text{Eq. 10}$$

With a corresponding Fourier transform, $$\omega_0(x) = \frac{\sin(\pi L x)}{\pi x} \qquad \text{Eq. 11}$$

Substituting in the acquisition length for L=157.2 s, the minimum FWHM is 7.7 mHz. The FWHM of the corresponding data is calculated by finding the half maximum of the center peak, and then finding the intersection of a horizontal line with that amplitude and the line plot of the spectrum in Mathematica using the Graphics'Mesh'FindIntersections@ function. For the data without apodization, the FWHM is measured as 7.7 mHz, matching the minimum theoretical value for this acquisition length.

Applying Hann windowing, the time domain window is given by, $$0.5\left(1 - \frac{\cos(2\pi x)}{L}\right) \qquad \text{Eq. 12}$$

With a corresponding Fourier transform, $$\omega_0(x) = 0.5 \frac{\sin(\pi x L)}{\pi x(1 - L^2 x^2)} \qquad \text{Eq. 13}$$

Again, substituting in the real acquisition length for L=157.2 s, the theoretical minimum FWHM is 12.7 mHz, matching an actual calculated FWHM of 12.8 mHz of the apodized data found using the same method as above.

While apodization allows for minimization of sinc artifacts in the frequency domain, it decreases the overall resolution by minimizing signal, leading to the overall greater linewidth of 12.8 mHz (Hann) vs. 7.7 mHz (Rect).

Example 4: SABRE-SHEATH Hyperpolarization of Pyruvate

Recent work in the field of SABRE hyperpolarization has significantly broadened the substrate scope from beyond traditional nitrogen heterocycles to include carboxylates and other similar substrates. These binding modes are enabled through introduction of a sulfoxide co-ligand such as methyl sulfoxide or methyl phenyl sulfoxide to allow for dynamic exchange of both the hydride and substrate on the iridium center. Specifically, this new chemistry enables SABRE hyperpolarization of pyruvate, a common biomolecule in cell energy metabolism. Imaging of pyruvate metabolism in vivo enables rapid detection of cancer cell metabolism via the Warburg effect accessing early cancer diagnosis and safe, reproducible imaging of ongoing cancer therapies.

Figure 7A:
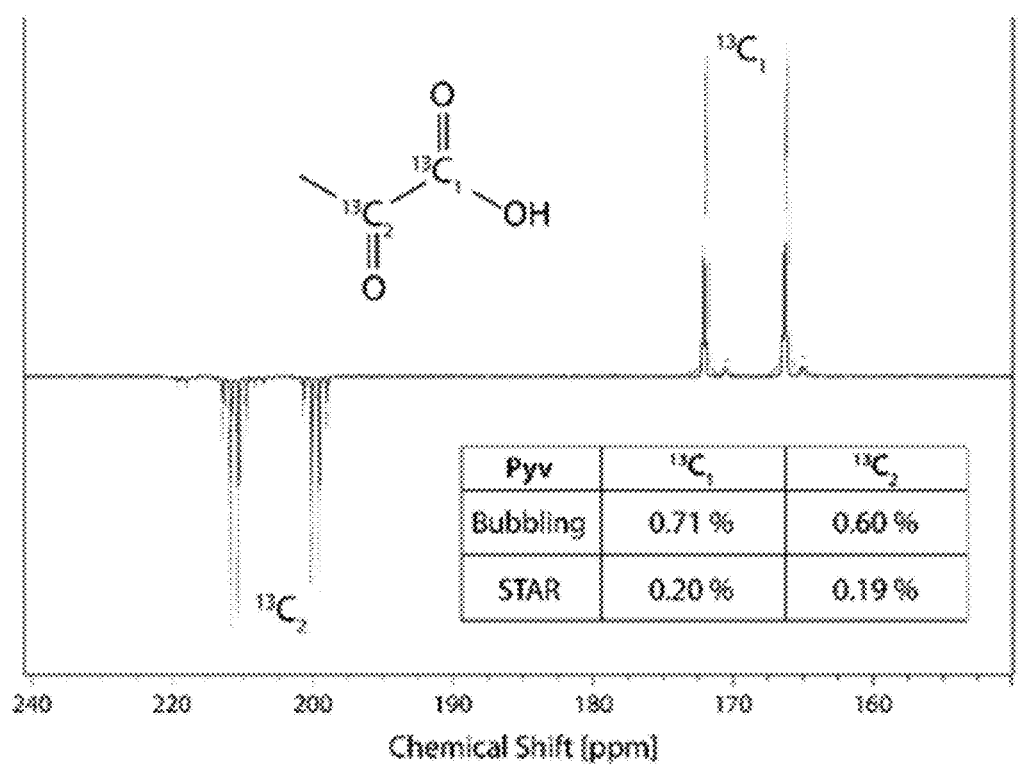
FIG. 7A shows $^{13}C$ hyperpolarization using SABRE-SHEATH in an exemplary reactor, detected at 1.1 T in a Magritek benchtop Spinsolve. Hyperpolarized $[^{13}C_2]$-pyruvate spectrum with the hyperpolarization reactor system at 2 mL/min. Light blue overlay is the spectrum achieved with a standard bubbling mode. Also shown is a reference thermalized spectrum of pure benzene and calculated polarization levels for each corresponding $^{13}C$ nucleus in pyruvate, based on the reference spectrum.

SABRE-driven parahydrogen hyperpolarization of pyruvate demonstrates a ground-breaking production of hyperpolarized material, as in contrast to previous parahydrogen and dynamic nuclear polarization methods SABRE can easily produce a continuous stream of hyperpolarized media. In addition, utilization of the singlet spin order on parahydrogen allows for generation of a long-lived singlet spin state on the two $^{13}C$ nuclei of $^{13}C_2$-pyruvate. We demonstrate large volume continuous production of hyperpolarized $^{13}C_2$-pyruvate for the first time, using SABRE-SHEATH in the an exemplary hyperpolarization reactor system (FIG. 7A). The current maximum polarization observed in our benchtop NMR with hyperpolarization reactor system is 0.20%, relative to maximum polarization on $^{13}C_2$-pyruvate using SABRE of 0.71% using a bubbling method of parahydrogen mixing (FIG. 7A).

The maximum numbers currently acquired with the hyperpolarization reactor system correspond to the 13.1 s retention time at 2 mL/min. This polarization corresponds to the previously discussed dependence, with polarization buildup rate constants of $T_b$ (1–$^{13}C$)=36.4±1.5 s and $T_b$ (2–$^{13}C$)=33.9±2.3 s for pyruvate hyperpolarized at 0.8 μT. This rate constant differs due to a difference in the spin evolution times in the temporary SABRE complex, primarily defined by the scalar couplings. As the singlet state hyperpolarized in pyruvate has a relatively long relaxation time $T_s$=85.4±8.5 s relative to the transfer time $T_t$=8.7 s, relaxation does not significantly impact the observed $^{13}C$ polarization. Accounting for the insufficient buildup time in this first generation scaled down reactor, the expected polarization at a retention time of 65 s is 0.70%, corresponding to the maximum polarization achieved with a bubbling method of parahydrogen mixing.

Example 5: SABRE-SHEATH Hyperpolarization of Metronidazole

While standard SABRE proton hyperpolarization utilizes mT magnetic field control to optimize parahydrogen spin order transfer to the target protons, this method can be adapted to hyperpolarization of spin ½ heteronuclei (e.g. $^{15}$N, $^{13}$C) by application of a microtesla field for the polarization transfer process. This method is termed SABRE-SHEATH (Shield Engenders Alignment Transfer to Heteronuclei). This field corresponds to the matching condition of aligning the J-coupling and frequency difference of the parahydrogen derived hydrides and target nuclei for spin order transfer. The difference in field arises from the large frequency difference given by the disparate gyromagnetic ratios of the hydrides and target heteronuclei in a SABRE complex. This frequency difference is minimized at microtesla fields accessed by magnetic shielding and fine-tuned with a small solenoid to meet the J-coupling and frequency difference matching condition described above.

Figure 7B:
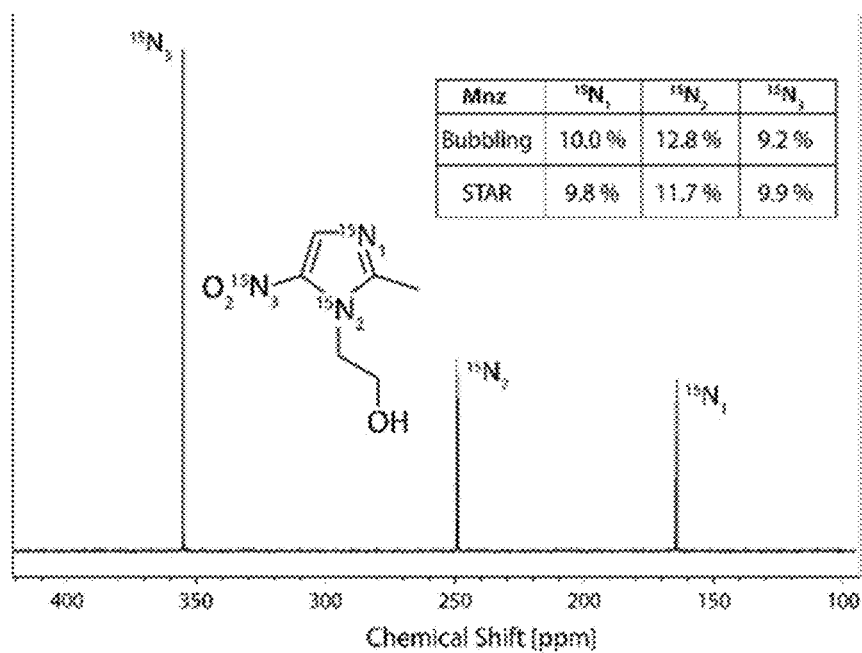
FIG. 7B shows $^{15}N$ hyperpolarization using SABRE-SHEATH in an exemplary reactor. Hyperpolarized $[^{15}N_3]$-metronidazole spectrum with the hyperpolarization reactor system at 3 mL/min. Overlay is the spectrum achieved with a standard bubbling mode. Also shown are calculated polarization levels for each corresponding $^{15}N$ nuclei in metronidazole, based on $^{15}N$ pyridine reference spectra.

The spectrum in FIG. 7B corresponds to the acquisition of continuous hyperpolarized [$^{15}$N$_3$]-metronidazole at high field. Using the disclosed system, we demonstrate similar heteronuclear polarization of metronidazole, a common antibiotic, as conventional bubbling parahydrogen mixing modes (inset table, FIG. 7B). Hyperpolarization of biologically relevant compounds such as metronidazole is of interest for injection in both in vivo pre-clinical and clinical studies to elucidate disease-associated metabolomic changes and disruptions. Metronidazole has potential as a probe for hypoxia sensing in the NAD$^+$/NADH metabolic cycle, mirroring the current implementation of $^{18}$F-fluoromisonidazole (FMISO) in positron emission tomography (PET) imaging. Metronidazole is of specific interest due to its high relative polarization and long associated relaxation times ($T_1$[$^{15}$N$_3$] =9.7 min).

While continuous proton SABRE polarization has been previously demonstrated at high field, the disclosed system is the first implementation of continuous SABRE-SHEATH in a high-field magnet. This feature enables a range of NMR techniques to be applied for rapid acquisition of SABRE hyperpolarized studies to examine SABRE dynamics, due to elimination of the recycle delay through the continuous pumping of hyperpolarized solution through the NMR tube. In addition, continuous production of a hyperpolarized substrates like metronidazole will enable future in vivo explorations by tapping hyperpolarized solution off the continuously cycling reactor system.

Example 6: Parahydrogen Pumped RASER Effects

The parahydrogen pumped RASER, or radiowave amplification by stimulated emission of radiation, is a newly explored physical effect in the field of magnetic resonance. This effect is the magnetic resonance analogue to a visible wavelength radiation in a LASER, requiring a pumped population inversion that results in coherent emission of radiation. Parahydrogen-induced RASER effects were first introduced in 2017, utilizing the parahydrogen-induced population inversion of SABRE to drive stimulated emission at NMR frequencies. Continuous pumping of NMR transitions in resonance with the LC NMR circuit enables continuous detection of NMR signal normally limited to $T_2$ relaxation, enabling measurement of NMR signals with linewidths of <3 mHz thereby accessing a range of applications including high-precision magnetometry. Several subsequent publications have explored this effect but have either been limited to low magnetic fields, where bubbling susceptibility artifacts are minimized, or restricted by short-lived or unstable RASER detection. In this work, we demonstrate the first expansion of SABRE-pumped RASER effects into high-field magnets (>1 T), demonstrating stable detection of RASER signals on the scale of minutes to hours.

Figures 8A, 8B:
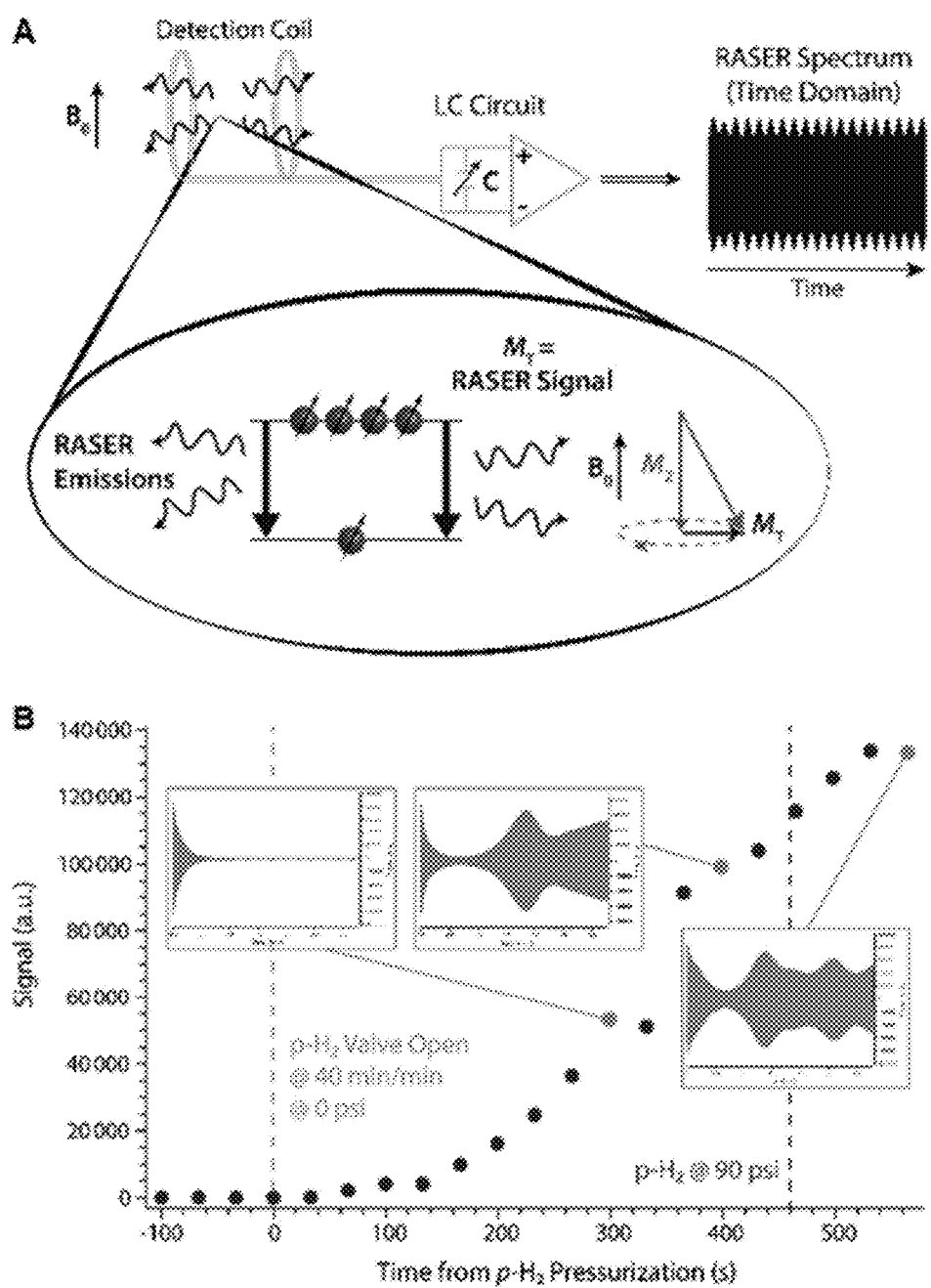
FIGS. 8A-8B show radiowave amplification by stimulated emission of radiation (RASER) physics effects and corresponding results acquired using an exemplary reactor and system.

A schematic of the basic RASER mode of operation and physics is shown in FIG. 8A. Here, a pumped high polarization nuclear spin inversion harnesses the photons in the NMR LC resonant circuit. This effect is enabled by the long relaxation rates of the nuclear spins relative to the fast decay rate of the photons in the resonator. Early iterations of these RASER demonstrations relied on high-quality-factor enhanced (EHQE) inductive or cryo-enhanced NMR detectors (Q>300) to generate strong interactions between the highly polarized solution and coil, but recent work demonstrated that RASER signals can be detected in even benchtop NMR spectrometers with quality factors below 100. We expand on these experiments that were achieved with single shot hydrogenative PHIP measurements to demonstrate continuous detection of parahydrogen RASER effects pumped with SABRE in a 1.1 T benchtop NMR.

In FIG. 8B, RASER effects during the buildup of polarization on pyrazine protons are shown. Polarization builds up slowly as the pressure is gradually ramped from 0 to 90 psi, due to both hyperpolarization in the system and activation of the pre-catalyst complex by removing the cyclooctadiene substituent. A threshold of polarization to induce RASER effects is observed after a polarization buildup/activation period of 340 s. The signal in this figure is initialized with a 90-degree proton pulse to open the receiver channel on the spectrometer. While the 90-degree pulse uses up most of the magnetization in the sensitive volume, this volume is displaced in 3.0 s at a pumping rate of 2.0 mL/min. Notably, as the polarization increases above the RASER threshold, the buildup time for observation of the emitted RASER pulses after the 90-degree pulse shortens significantly as the system reaches a higher polarization level. The polarization threshold of a RASER system is given by $$d_{th} = \frac{-8}{\mu_0 \eta \hbar \gamma^2 T_2 Q n_s} \quad \text{(Eq. 14)}$$

where $d_{th}$ gives the polarization threshold in a number of spins, $\mu_0$ is the vacuum permittivity, $\eta$ is the fill factor of the coil, $\gamma$ is the gyromagnetic ratio of the target spins, $T_2$ is the transverse relaxation, Q is the quality factor of the LC coil, and ns is the number of spins in the sample.

In a standard RASER experiment with the disclosed hyperpolarization reactor system, we use a minimal 2-degree initialization pulse to open the receiver channel while still observing significant signal from the proton RASER. Detection periods of 26 s of a continuous RASER signal illustrate a picture of the polarization level at different flow rates that reflects similar trends previously discussed. Notably, the FWHM of the NMR signal intensity increases significantly as the flow rate is increased and more RASER bursts are observed in the same period. Due to the minimized dependence on $T_2$ in RASER experiments, continuous RASER experiments exhibit significantly sharper linewidths than the calibrated FWHM shim level (1.42 Hz) of the magnet while flowing solution.

Figure 9A:
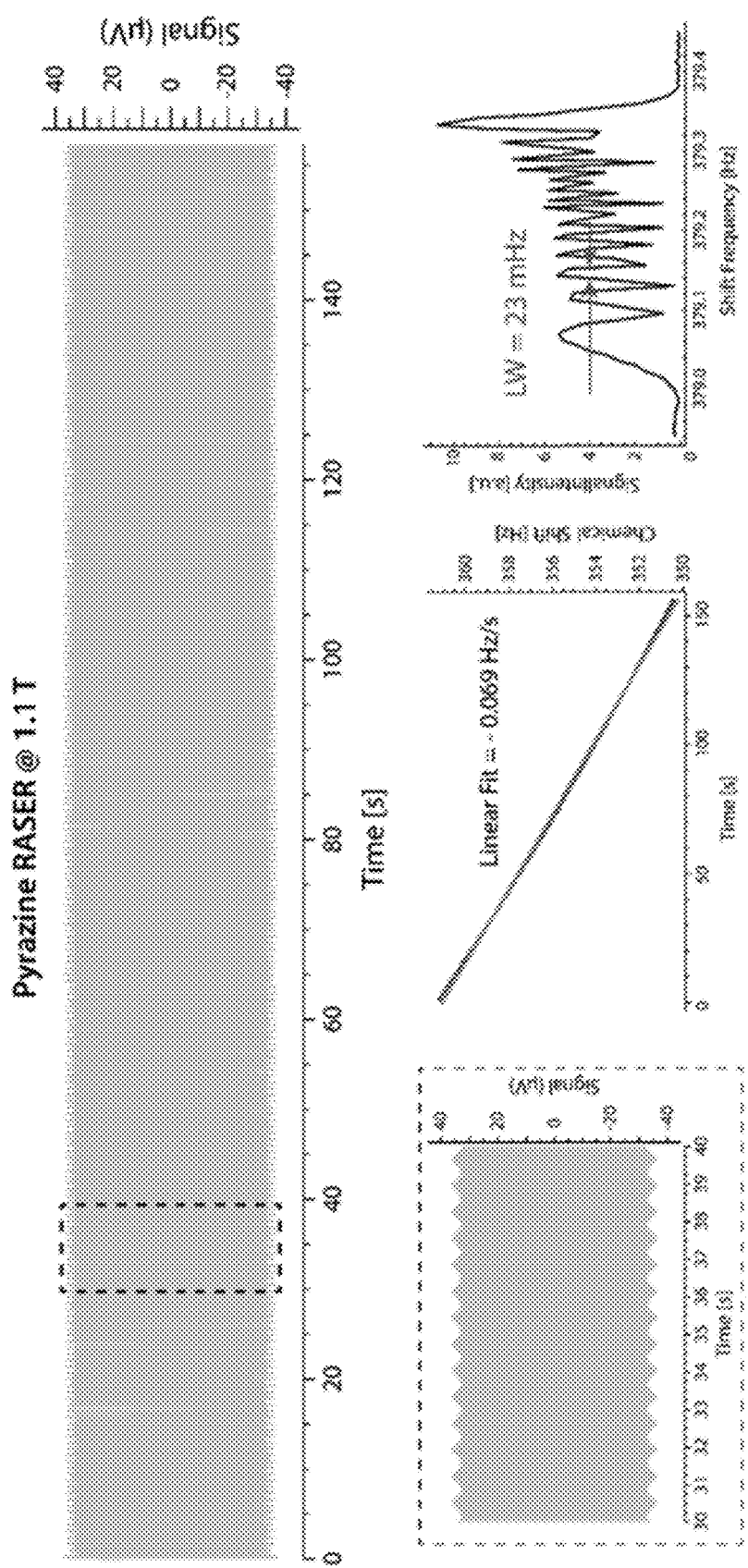
FIGS. 9A-9B show continuous RASER results acquired using an exemplary reactor and system at both 1.1 T and 9.4 T in two different chemical systems.
Figure 9B:
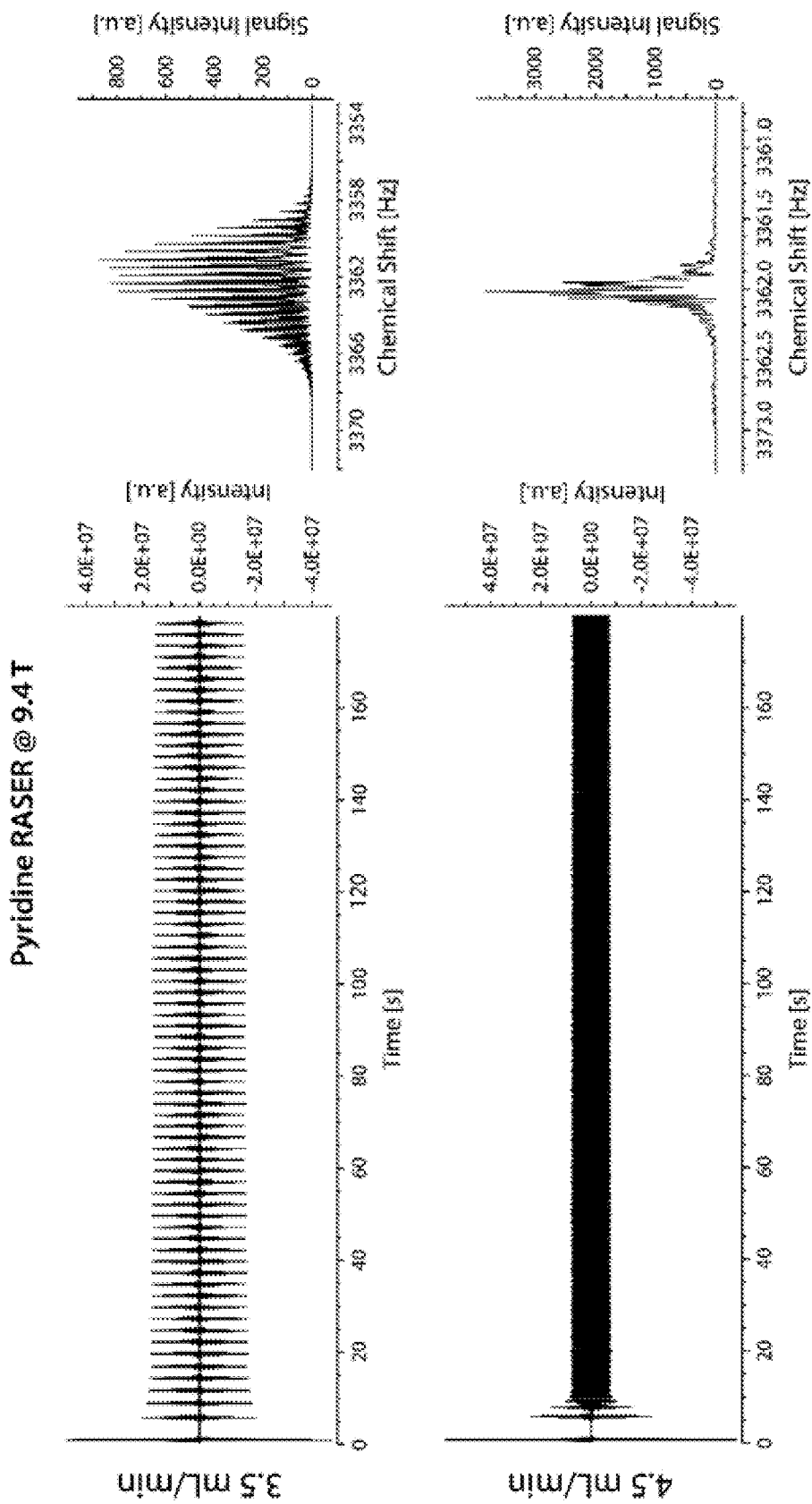

We detect a continuous RASER signal for up to 157.3 s in the Spinsolve (Magritek) system, limited in our detection time only by the single experiment data acquisition memory of the spectrometer (FIG. 9A). For these extended acquisition periods the number of points acquired in the time domain is maximized to the memory limit by increasing the dwell time close to the Nyquist sampling limit. However, even in this nearly undersampled case we observe continuous RASER signal for the entire acquisition period. This continuous acquisition period allows for accurate measurement of the magnetic field drift of the permanent magnet array, fitting a quadratic drift. The fitting procedure is carried out on a sliced time domain, described in further detail elsewhere herein. When corrected for the quadratic drift, we obtain a single NMR peak for pyrazine, as all protons in the chemical system are equivalent. The Fourier transform (FFT) NMR peak has a full width half maximum (FWHM) linewidth equal to the theoretical minimum, based on the total acquisition time of the RASER (157.2 s), 12.8 mHz. The theoretical minimum is calculated by taking the Fourier transform of a general rect function with L=157.2. I Additionally, we demonstrate the detection of continuous RASER effects in a pyridine SABRE solution, showing continuous acquisition of a stable RASER spectra detected at 9.4 T for 180 s (FIG. 9B). The flow dependence with pumping at 3.5 mL/min and 4.5 mL/min demonstrates the dependence of this system on the cycling of solution through the sensitive volume of the LC detection coil and on the extent to which the polarization in the system is above the previously described RASER threshold (Eq. 1). The magnitude Fourier transform (FFT) of the RASER FID for each respective flow rate is shown at the right of FIG. 9B, using a Sine II apodization (Supplementary Information) positioned at the center of the FID.

Based on these demonstrations, the disclosed reactor system is perfectly positioned to be easily expanded beyond benchtop systems for both high- and low-field RASER experiments in the future, including enabling testing of heteronuclear RASER phenomenon by coupling SABRE-SHEATH methods described in the previous section.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

ASPECTS

The present disclosure can be described in accordance with the following numbered Aspects, which should not be confused with the claims.

Aspect 1. A compact membrane reactor for parahydrogen-induced hyperpolarization, the reactor comprising:
(a) an inner tube comprising a semipermeable membrane;
(b) an outer tube surrounding the inner tube; and
(c) a means for controlling a magnetic field surrounding the outer tube;
wherein the means for controlling a magnetic field is configured to hyperpolarize parahydrogen in the outer tube and wherein the hyperpolarized parahydrogen permeates the inner tube and induces hyperpolarization in a sample in the inner tube.

Aspect 2. The compact membrane reactor of aspect 1, wherein the semipermeable membrane comprises a gas-liquid interfacial area of greater than 1000 $m^2/m^3$.

Aspect 3. The compact membrane reactor of aspect 1, wherein the semipermeable membrane comprises a gas-liquid interfacial area of greater than 5000 $m^2/m^3$.

Aspect 4. The compact membrane reactor of any of aspects 1-3, wherein the semipermeable membrane comprises an amorphous fluoropolymer.

Aspect 5. The compact membrane reactor of any of aspects 1-4, wherein the outer tube comprises a fluorinated ethylene propylene polymer.

Aspect 6. The compact membrane reactor of any of aspects 1-5, wherein the compact membrane reactor comprises a length of from about 0.25 m to about 10 m.

Aspect 7. The compact membrane reactor of any of aspects 1-5, wherein the compact membrane reactor comprises a length of from about 0.5 m to about 3 m.

Aspect 8. The compact membrane reactor of any of aspects 1-5, wherein the compact membrane reactor comprises a length of about 1 m.

Aspect 9. The compact membrane reactor of any of aspects 1-8, wherein the compact membrane reactor comprises an inner diameter of from about 0.001 in to about 0.1 in.

Aspect 10. The compact membrane reactor of any of aspects 1-8, wherein the compact membrane reactor comprises an inner diameter of from about 0.005 in to about 0.05 in.

Aspect 11. The compact membrane reactor of any of aspects 1-10, wherein the inner tube and outer tube are configured as a coil.

Aspect 12. The compact membrane reactor of aspect 11, wherein the coil has a diameter of from about 1 cm to about 5 cm.

Aspect 13. The compact membrane reactor of any of aspects 1-12, wherein the means for controlling a magnetic field comprises a radio frequency coil, a shielding mechanism, a solenoid powered with direct current, a permanent magnet array, a superconducting magnet, or a combination thereof.

Aspect 14. A method of using the compact membrane reactor of any of aspects 1-13 to generate high spin polarization on a spin ½ nucleus in a sample, the method comprising:
(a) introducing a solution comprising the sample through the inner tube;
(b) introducing parahydrogen through the outer tube; and
(c) applying a current to the means for controlling a magnetic field to generate a magnetic field.

Aspect 15. The method of aspect 14, wherein the spin ½ nucleus comprises $^1H$, $^{13}C$, $^{15}N$, $^{19}F$, $^{31}P$, or any combination thereof.

Aspect 16. The method of aspect 14 or 15, wherein the high spin polarization is generated by hydrogenation.

Aspect 17. The method of aspect 14 or 15, wherein the high spin polarization is generated by signal amplification by reversible exchange.

Aspect 18. The method of any of aspects 14-17, wherein the solution comprising the sample further comprises a polarization transfer catalyst.

Aspect 19. The method of aspect 18, wherein a polarization transfer catalyst is immobilized on a solid support.

Aspect 20. The method of aspect 19, wherein the solid support comprises silica particles.

Aspect 21. The method of aspect 19, wherein the solid support comprises the semipermeable membrane.

Aspect 22. The method of any of aspects 14-21, wherein the current has a frequency of from about 0 Hz to about 300 GHz.

Aspect 23. The method of any of aspects 14-21, wherein the current has a frequency of from about 0 Hz to about 1 GHz.

Aspect 24. The method of any of aspects 14-21, wherein the current has a frequency of about 400 kHz.

Aspect 25. A method for continuous detection of radio-wave amplification by stimulated emission of radiation (RASER) effects in a sample using a nuclear magnetic resonance (NMR) spectrometer, the method comprising:
(a) subjecting the sample to the method of any one of aspects 14-24; and
(b) analyzing the sample using the NMR spectrometer.

Aspect 26. The method of aspect 25, wherein RASER effects are observable when parahydrogen pressure in the outer tube is about 90 psi (620.5 kPa).

Aspect 27. The method of aspect 25 or 26, wherein RASER effects are observable when the sample is introduced through the inner tube at a rate of from about 2.0 mL/min to about 4.5 mL/min.

Aspect 28. The method of any one of aspects 25-27, wherein the RASER effects are observable for a period of time longer than a $T_2$ relaxation time for protons in the sample.

Aspect 29. The method of any one of aspects 25-27, wherein the RASER effects are observable for a period of from about 1 minute to about 10 minutes.

Aspect 30. The method of any one of aspects 25-27, wherein the RASER effects are observable for about 3 minutes.

Aspect 31. The method of any one of aspects 25-30, wherein the RASER effects are observable when the NMR spectrometer has a field strength of from about 1 T to about 10 T.

Aspect 32. The method of aspect 31, wherein the NMR spectrometer has a field strength of about 1.1 T.

Aspect 33. The method of aspect 31, wherein the NMR spectrometer has a field strength of about 9.4 T.

Aspect 34. A sample preparation system comprising at least one compact membrane reactor of any of aspects 1-13 and fluid handling apparatus.

Aspect 35. The sample preparation system of aspect 34, further comprising a plurality of additional compact membrane reactors arranged in parallel with the at least one compact membrane reactor.

Aspect 36. The sample preparation system of aspect 34 or 35, wherein the fluid handling apparatus comprises a batch mode fluid handling apparatus, a continuous mode fluid handling apparatus, or a segmented flow fluid handling apparatus.

Aspect 37. The sample preparation system of aspect 36, wherein the fluid handling apparatus comprises a batch mode fluid handling apparatus and wherein the fluid handling apparatus further comprises a catalyst-removal unit.

Aspect 38. The sample preparation system of aspect 37, wherein the catalyst-removal unit comprises a column containing a first medium, a solvent-switching system, a filtration system, or any combination thereof.

Aspect 39. The sample preparation system of aspect 38, wherein the catalyst-removal unit is a column containing a first medium and wherein the first medium comprises thiol-doped silicon microparticles.

Aspect 40. The sample preparation system of aspect 38 or 39, wherein the column further comprises a second medium.

Aspect 41. The sample preparation system of aspect 40, wherein the second medium comprises high iridium affinity $MoS_2$ extraction sheets.

Aspect 42. The sample preparation system of any of aspects 34-41, wherein the catalyst-removal unit comprises a nanofiltration membrane.

Aspect 43. The sample preparation system of aspect 42, wherein the nanofiltration membrane comprises a molecular weight cutoff of from about 150 Da to about 1000 Da.

Aspect 44. The sample preparation system of any of aspects 34-43, wherein the fluid handling apparatus comprises a continuous mode fluid handling apparatus configured for preparing samples continuously to a steady state with batch dispensing for analysis, for preparing stopped-mode samples with batch dispensing for analysis, or for preparing samples continuously to a steady state with continuous injection.

Aspect 45. The sample preparation system of any of aspects 34-44, further comprising one or more gas displacement systems.

Aspect 46. The sample preparation system of aspect 45, wherein the one or more gas displacement systems comprises an inert gas degassing reactor, a depressurization stage, or a combination thereof.

Aspect 47. The compact membrane reactor of any of aspects 1-13 or the sample preparation system of any of aspects 34-46, further comprising a temperature control device.

Aspect 48. The compact membrane reactor of any of aspects 1-13 or the sample preparation system of any of aspects 34-46, further comprising a means for generating a turbulent flow.

Aspect 49. The compact membrane reactor of any of aspects 1-13 or the sample preparation system of any of aspects 34-46, further comprising at least one means for controlling the magnetic field to which the compact membrane reactor is exposed.

Aspect 50. The compact membrane reactor of any of aspects 1-13 or the sample preparation system of any of aspects 34-46, wherein the means for controlling the magnetic field comprises a permanent magnet, an electromagnet, a superconducting magnet, magnetic shielding, or a combination thereof.

Aspect 51. A hyperpolarized sample prepared by the sample preparation system of any of aspects 34-46, wherein the hyperpolarized sample is substantially free of polarization transfer catalyst.

REFERENCES

1. Adams, R W, et al, A theoretical basis for spontaneous polarization transfer in non-hydrogenative parahydrogen-induced polarization. J. Chem. Phys. 131, 194505 (2009).
2. Adams, R W, et al, Reversible interactions with parahydrogen enhance NMR sensitivity by polarization transfer. Science (80-.). 323, 1708-1711 (2009).
3. Appelt, S, et al, From LASER physics to the parahydrogen pumped RASER. Prog. Nucl. Magn. Reson. Spectrosc. 114-115, 1-32 (2019).
4. Appelt, S, et al, SABRE and PHIP pumped RASER and the Route to Chaos. J. Magn. Reson., 106815 (2020).
5. Barskiy, D A, et al, SABRE: Chemical kinetics and spin dynamics of the formation of hyperpolarization. Prog. Nucl. Magn. Reson. Spectrosc. 114-115, 33-70 (2019).

6. Barskiy, D A, et al., Over 20% 15N Hyperpolarization in under One Minute for Metronidazole, an Antibiotic and Hypoxia Probe. J. Am. Chem. Soc. 138, 8080-8083 (2016).
7. Bok, R, et al., Metabolic Imaging of Patients with Prostate Cancer Using Hyperpolarized [1-13C]Pyruvate. Sci. Transl. Med. 5, 198ra108-198ra108 (2013).
8. Bowers, C R, et al, Transformation of symmetrization order to nuclear-spin magnetization by chemical reaction and nuclear magnetic resonance. Phys. Rev. Lett. 57, 2645-2648 (1986).
9. Cavallari, E, et al, Studies to enhance the hyperpolarization level in PHIP-SAH-produced C13-pyruvate. J. Magn. Reson. 289, 12-17 (2018).
10. Cavallari, E, et al, The 13C hyperpolarized pyruvate generated by ParaHydrogen detects the response of the heart to altered metabolism in real time. Sci. Rep. 8, 8366 (2018).
11. Charpentier, J C "Mass-Transfer Rates in Gas-Liquid Absorbers and Reactors" in Advances in Chemical Engineering, Advances in Chemical Engineering, T. B. Drew, et al, Eds. (Academic Press, 1981), pp. 1-133.
12. Colell, J F P, et al., Generalizing, Extending, and Maximizing Nitrogen-15 Hyperpolarization Induced by Parahydrogen in Reversible Exchange. J. Phys. Chem. C 121, 6626-6634 (2017).
13. Cowley, M J, et al., Iridium N-heterocyclic carbene complexes as efficient catalysts for magnetization transfer from para-hydrogen. J. Am. Chem. Soc. 133, 6134-6137 (2011).
14. Duckett, S B, et al, Application of Para hydrogen Induced Polarization Techniques in NMR Spectroscopy and Imaging. Acc. Chem. Res. 45, 1247-1257 (2012).
15. Gallagher, F A, et al., Imaging breast cancer using hyperpolarized carbon-13 MRI. Proc. Natl. Acad. Sci. U.S.A 117, 2092-2098 (2020).
16. Goldman, M, et al, Principles of dynamic nuclear polarisation. Reports Prog. Phys. 41, 395 (1978).
17. Halse, M E, Perspectives for hyperpolarisation in compact NMR. TrAC—Trends Anal. Chem. 83, 76-83 (2016).
18. Han, S, et al, Accelerating gas-liquid chemical reactions in flow. Chem. Commun. 56, 10593-10606 (2020).
19. Hovener, J, et al, Parahydrogen-based Hyperpolarization for Biomedicine. Angew. Chemie Int. Ed. (2018) https:/doi.org/10.1002/anie.201711842.
20. Iali, W, et al, Hyperpolarising Pyruvate through Signal Amplification by Reversible Exchange (SABRE). Angew. Chemie 131, 10377-10381 (2019).
21. Ivanov, K L, et al, The role of level anti-crossings in nuclear spin hyperpolarization. Prog. Nucl. Magn. Reson. Spectrosc. 81, 1-36 (2014).
22. Joalland, J, et al, Parahydrogen-Induced Radio Amplification by Stimulated Emission of Radiation. Angew. Chemie—Int. Ed. 59, 8654-8660 (2020).
23. Kovtunov, K V, et al., Hyperpolarized NMR Spectroscopy: d-DNP, PHIP, and SABRE Techniques. Chem.—An Asian J. 13, 1857-1871 (2018).
24. Lehmkuhl, S, et al., Continuous hyperpolarization with parahydrogen in a membrane reactor. J. Magn. Reson. 291, 8-13 (2018).
25. Nelson, S J, et al., Metabolic Imaging of Patients with Prostate Cancer Using Hyperpolarized [1-13C]Pyruvate. Sci. Transl. Med. 5, 198ra108-198ra108 (2013).
26. Nikolaou, P, et al, NMR hyperpolarization techniques for biomedicine. Chem.—A Eur. J. 21, 3156-3166 (2015).
27. Pravdivtsev, A N, et al, Continuous Radio Amplification by Stimulated Emission of Radiation using Parahydrogen Induced Polarization (PHIP-RASER) at 14 Tesla. Chem Phys Chem 21, 667-672 (2020).
28. Rajendran, J G, et al., [18F]FMISO and [18F]FDG PET imaging in soft tissue sarcomas: Correlation of hypoxia, metabolism and VEGF expression. Eur. J. Nucl. Med. Mol. Imaging 30, 695-704 (2003).
29. Richardson, P M, et al, A simple hand-held magnet array for efficient and reproducible SABRE hyperpolarisation using manual sample shaking. Magn. Reson. Chem. 56, 641-650 (2018).
30. Roth, M, et al., Continuous 1H and 13C signal enhancement in NMR spectroscopy and MRI using parahydrogen and hollow-fiber membranes. Angew. Chemie—Int. Ed. 49, 8358-8362 (2010).
31. Serrao, E M, et al, Potential clinical roles for metabolic imaging with hyperpolarized [1-13C]pyruvate. Front. Oncol. 6, 1-6 (2016).
32. Shchepin, R V, et al, Hyperpolarizing Concentrated Metronidazole 15 NO 2 Group over Six Chemical Bonds with More than 15% Polarization and a 20 Minute Lifetime. Chem.—A Eur. J. 176, chem. 201901192 (2019).
33. Shukla-Dave, A, et al, Role of MRI in prostate cancer detection. NMR Biomed. 27, 16-24 (2014).
34. Štěpánek, P, et al, High-throughput continuous-flow system for SABRE hyperpolarization. J. Magn. Reson. 300, 8-17 (2019).
35. Suefke, M, et al, Para-hydrogen raser delivers sub-millihertz resolution in nuclear magnetic resonance. Nat. Phys. 13, 568-572 (2017).
36. Theis, T, et al, Microtesla SABRE enables 10% nitrogen-15 nuclear Spin polarization. J. Am. Chem. Soc. 137, 1404-1407 (2015).
37. Theis, T, et al., Direct and cost-efficient hyperpolarization of long-lived nuclear spin states on universal 15N2-diazirine molecular tags. Sci. Adv. 2, 1-8 (2016).
38. Theis, T, et al., Microtesla SABRE enables 10% nitrogen-15 nuclear Spin polarization. J. Am. Chem. Soc. 137, 1404-1407 (2015).
39. TomHon, P, et al, Automated pneumatic shuttle for magnetic field cycling and parahydrogen hyperpolarized multidimensional NMR. J. Magn. Reson. 312, 106700 (2020).
40. Vuichoud, B, et al, Filterable Agents for Hyperpolarization of Water, Metabolites, and Proteins. Chem.—A Eur. J. 22, 14696-14700 (2016).
41. Walker, T G et al, Spin-exchange optical pumping of noble-gas nuclei. Rev. Mod. Phys. 69, 629-642 (1997).
42. Yang, L, et al, Mass transport and reactions in the tube-in-tube reactor. Org. Process Res. Dev. 17, 927-933 (2013).
43. Yue, J, et al, Hydrodynamics and mass transfer characteristics in gas-liquid flow through a rectangular microchannel. Chem. Eng. Sci. 62, 2096-2108 (2007).

What is claimed is:

1. A sample preparation system for parahydrogen-induced hyperpolarization, the system comprising:
   at least one compact membrane reactor, the reactor comprising:
   (a) an inner tube comprising a semipermeable membrane;
   (b) an outer tube surrounding the inner tube; and
   (c) a means for controlling a magnetic field surrounding the outer tube; wherein the means for controlling a magnetic field is configured to hyperpolarize parahydrogen in the outer tube and wherein the hyperpolarized parahydrogen permeates the inner tube and induces hyperpolarization in a sample in the inner tube; and a fluid handling apparatus, wherein the fluid handling apparatus comprises a batch mode fluid handling apparatus and a catalyst removal unit, wherein the catalyst-removal unit is a column comprising a first medium and wherein the first medium comprises thiol-doped silicon microparticles.

2. The sample preparation system of claim 1, wherein the semipermeable membrane comprises a gas-liquid interfacial area of greater than 1000 m$^2$/m$^3$.

3. The sample preparation system of claim 1, wherein the semipermeable membrane comprises an amorphous fluoropolymer.

4. The sample preparation system of claim 1, wherein the means for controlling a magnetic field comprises a radio frequency coil, a shielding mechanism, a solenoid powered with direct current, a permanent magnet array, a superconducting magnet, or a combination thereof.

5. A method of using the sample preparation system of claim 1 to generate high spin polarization on a spin ½ nucleus in a sample, the method comprising: (a) introducing a solution comprising the sample through the inner tube; (b) introducing parahydrogen through the outer tube; and (c) applying a current to the means for controlling a magnetic field to generate a magnetic field.

6. The method of claim 5, wherein the spin ½ nucleus comprises $^1$H, $^{13}$C, $^{15}$N, $^{19}$F, $^{31}$P, or any combination thereof.

7. The method of claim 5, wherein the high spin polarization is generated by hydrogenation.

8. The method of claim 5, wherein the high spin polarization is generated by signal amplification by reversible exchange.

9. The method of claim 5, wherein the solution comprising the sample further comprises a polarization transfer catalyst.

10. A method for continuous detection of radiowave amplification by stimulated emission of radiation (RASER) effects in a sample using a nuclear magnetic resonance (NMR) spectrometer, the method comprising: (a) subjecting the sample to the method of claim 5; and (b) analyzing the sample using the NMR spectrometer.

11. The method of claim 10, wherein RASER effects are observable when parahydrogen pressure in the outer tube is about 90 psi (620.5 kPa).

12. The method of claim 10, wherein the RASER effects are observable for a period of time longer than a $T_2$ relaxation time for protons in the sample.

13. The method of claim 10, wherein the RASER effects are observable when the NMR spectrometer has a field strength of from about 1 T to about 10 T.

14. The sample preparation system of claim 1, wherein the column further comprises a second medium, and wherein the second medium comprises high iridium affinity MoS extraction sheets.

15. The sample preparation system of claim 1, wherein the catalyst-removal unit comprises a nanofiltration membrane having a molecular weight cutoff of from about 150 Da to about 1000 Da.

16. A hyperpolarized sample prepared by the sample preparation system of claim 1, wherein the hyperpolarized sample is substantially free of polarization transfer catalyst.

* * * * *